(12) United States Patent
Kubota et al.

(10) Patent No.: US 7,023,992 B1
(45) Date of Patent: Apr. 4, 2006

(54) DATA MULTIPLEXING DEVICE, PROGRAM DISTRIBUTION SYSTEM, PROGRAM TRANSMISSION SYSTEM, PAY BROADCAST SYSTEM, PROGRAM TRANSMISSION METHOD, CONDITIONAL ACCESS SYSTEM, AND DATA RECEPTION DEVICE

(75) Inventors: Tatsuya Kubota, Kanagawa (JP); Norio Wakatsuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/370,776

(22) Filed: Aug. 9, 1999

Related U.S. Application Data

(63) Continuation of application No. PCT/JP98/03127, filed on Jul. 13, 1998.

(30) Foreign Application Priority Data

Jun. 11, 1997 (JP) .................................... 9-171039

(51) Int. Cl.
*H04N 7/167* (2006.01)

(52) U.S. Cl. .......................... 380/210; 380/42; 380/43; 380/44; 380/203; 380/205; 380/212; 380/239; 380/261; 705/50; 705/51; 725/31

(58) Field of Classification Search ................ 380/261, 380/43, 203, 212, 239, 42, 205, 44; 705/50, 705/51; 725/31
See application file for complete search history.

(56) References Cited

U.S. PATENT DOCUMENTS

| 5,367,269 | A | * | 11/1994 | Yanagidaira et al. | ......... 331/14 |
| 5,420,866 | A | | 5/1995 | Wasilewski | |
| 5,506,903 | A | * | 4/1996 | Yamashita | .................. 380/216 |
| 5,774,548 | A | * | 6/1998 | Bando et al. | .................. 380/9 |
| 5,929,916 | A | * | 7/1999 | Legall et al. | .......... 375/240.05 |
| 6,069,956 | A | * | 5/2000 | Kurihara | ...................... 380/212 |
| 6,097,757 | A | * | 8/2000 | Boice et al. | ................. 375/240 |
| 6,198,878 | B1 | * | 3/2001 | Blawat et al. | .............. 386/111 |

FOREIGN PATENT DOCUMENTS

JP          7-202884      8/1995

(Continued)

*Primary Examiner*—Matthew Smithers
*Assistant Examiner*—Paul Callahan
(74) *Attorney, Agent, or Firm*—Frommer Lawrence & Haug LLP; William S. Frommer; Thomas F. Presson

(57) ABSTRACT

In a data multiplexing device which multiplexes and transmits the transport stream packets of program data consisting of a plurality of data elements constructed in the form of transport stream packets, a program distribution system, a program transmission system, a pay broadcast system, a program transmission method, a conditional access system, and a data reception device according to the present invention, by generating a scramble key Ks corresponding to one or more data elements among the plurality of data elements constituting a program and by scrambling each data element, an audience can subscribe for each data element.

8 Claims, 23 Drawing Sheets

FOREIGN PATENT DOCUMENTS

| | | |
|---|---|---|
| JP | 8-289277 | 11/1996 |
| JP | 8-340514 | 12/1996 |
| JP | 8-340541 | 12/1996 |
| JP | 9-9241 | 1/1997 |
| JP | 9-46672 | 2/1997 |
| JP | 9-46681 | 2/1997 |
| JP | 9-51520 | 2/1997 |
| JP | 9-284762 | 10/1997 |
| JP | 9-284763 | 10/1997 |
| JP | 9-307542 | 11/1997 |
| JP | 9-511369 | 11/1997 |
| JP | 9-312625 | 12/1997 |
| JP | 9-322161 | 12/1997 |
| JP | 10-126371 | 5/1998 |
| WO | WO 95/26597 | 10/1995 |

* cited by examiner

| Program number | Video | Main Audio | Sub Audio | Private |
|---|---|---|---|---|
| 1 | Ks1 | --- | --- | --- |
| 2 | Ks2 | | Ks3 | Ks4 |
| 3 | Ks5 | Ks6 | --- | --- |
| 4 | Ks7 | Ks8 | Ks9 | Ks10 |
| 5 | Ks11 | | | |
| 6 | Ks12 | | --- | --- |
| 7 | Ks13 | | | Ks14 |
| 8 | Ks15 | | | |
| 9 | Ks16 | Ks17 | Ks18 | Ks19 |

FIG. 2

| PID VALUE | INFORMATION RECORDED IN A PACKET |
|---|---|
| 0x0000 | PAT |
| 0x0001 | CAT |
| 0x0002~0x000F | Reserved |
| 0x0010 | NIT、ST |
| 0x0011 | SDT、BAT、ST |
| 0x0012 | EIT、ST |
| 0x0013 | RST、ST |
| 0x0014 | TDT |
| 0x0015~0x001F | Reserved |
| 0x0020~0x1FFE | PMT, VIDEO/AUDIO DATA STREAM |
| 0x1FFF | Null Packet |

FIG. 3

PID TABLE

| PACKET TYPE | PID VALUE | SCRAMBLE KEY |
|---|---|---|
| PATPACKET | 0×0000 FIXED VALUE | --- |
| ⋮ | ⋮ | |
| PMT1PACKET | 0×0100 | --- |
| PMT2PACKET | 0×0101 | --- |
| ⋮ | ⋮ | |
| ECM1PACKET | 0×0300 | --- |
| ⋮ | ⋮ | |
| ECM2PACKET | 0×0351 | --- |
| ECM2PACKET | 0×0352 | --- |
| ECM3PACKET | 0×0353 | --- |
| ECM4PACKET | 0×0354 | --- |
| ⋮ | ⋮ | |
| Video[1]PACKET | 0×0500 | Ks1 |
| Main_Audio[1]PACKET | 0×0501 | Ks1 |
| Video[2]PACKET | 0×0502 | Ks2 |
| Main_Audio[2]PACKET | 0×0503 | Ks2 |
| Sub_Audio[2]PACKET | 0×0504 | Ks3 |
| Private[2]PACKET | 0×0505 | Ks4 |
| ⋮ | ⋮ | |
| CATPACKET | 0×0001 (FIXED VALUE) | --- |
| ⋮ | ⋮ | |
| EMMPACKET | 0×0700 | --- |
| ⋮ | ⋮ | |

FIG. 4

| SYNTAX | NUMBER OF BITS | MNEMONIC |
|---|---|---|
| transport packet(){ | | |
|     sync_byte | 8 | bslbf |
|     transport_error_indicator | 1 | bslbf |
|     payload_unit_start_indicator | 1 | bslbf |
|     transport_priority | 1 | bslbf |
|     PID | 13 | uimsbf |
|     transport_scrambling_control | 2 | bslbf |
|     adaptation_field_control | 2 | bslbf |
|     continuity_counter | 4 | uimsbf |
|     if(adaptation_field_control==' \|\| adaptation_field_control=='11'{ | | |
|         adaptation filed() | | |
|     } | | |
|     if(adaptation_field_control==' \|\| adaptation_field_control=='11'{ | | |
|         for(i=0; i<N; i++){ | | |
|             data_byte | 8 | bslbf |
|         } | | |
|     } | | |
| } | | |

FIG. 6

| SYNTAX | NUMBER OF BITS | MNEMONIC |
|---|---|---|
| adaptation_field(){ | | |
|     adaptation_filed_length | 8 | uimsbf |
|     if(adaptation_field_length>0){ | | |
|         discontinuity_indicator | 1 | bslbf |
|         random access_indicator | 1 | bslbf |
|         elementary_stream_priority_indicator | 1 | bslbf |
|         PCR_flag | 1 | bslbf |
|         OPCR_flag | 1 | bslbf |
|         splicing_point_flag | 1 | bslbf |
|         transport_private_data_flag | 1 | bslbf |
|         adaptation_field_extension_flag | 1 | bslbf |
|         if(PCR_flag=='1'){ | | |
|             program_clock_reference_base | 33 | uimsbf |
|             reserved | 6 | bslbf |
|             program_clock_reference_extension | 9 | uimsbf |
|         } | | |
|         if(OPCR_flag=='1'){ | | |
|             original_program_clock_reference_base | 33 | uimsbf |
|             reserved | 6 | bslbf |
|             original_program_clock_reference_extension | 9 | uimsbf |
|     } | | |
|     if(splicing_point_flag=='1'){ | | |
|         splice_countdown | 8 | tcimsbf |
|     } | | |
|     if(transport_private_data_flag=='1'){ | | |
|         transport_private_data_length | 8 | uimsbf |
|         for(i=0;i<transport_private_data_length;i++;){ | | |
|             private_data_byte | 8 | bslbf |
|         } | | |
|     } | | |
|     if(adaptation_field_extension_flag=='1'){ | | |
|         adaptation_field_extension_length | 8 | uimsbf |
|         ltw_flag | 1 | bslbf |
|         piecewise_rate_flag | 1 | bslbf |
|         seamless_splice_flag | 1 | bslbf |

FIG. 7

```
            reserved                              5      bslbf
            if(ltw_flag=='1'){
                ltw_valid_flag                    1      bslbf
                ltw_offset                       15      uimsbf
            }
            if(piecewise_rate_flag=='1'){
                reserved                          2      bslbf
                piecewise_rate                   22      uimsbf
            }
            if(seamless_splice_flag=='1'){
                splice_type                       4      bslbf
                DTS_next_AU[32..30]               3      bslbf
                market_bit                        1      bslbf
                DTS_next_AU[29..15]              15      bslbf
                marker_bit                        1      bslbf
                DTS_next_AU[14..0]               15      bslbf
                marker_bit                        1      bslbf
            }
            for(i=0;i<N;i++){
                reserved                          8      bslbf
            }
        }
        for(i=0;i<N;i++){
            stuffing_byte                         8      bslbf
        }
    }
}
```

FIG. 8

| STRUCTURE NAME | ASSIGNED PID # | DESCRIPTION |
|---|---|---|
| PROGRAM ASSOCIATION TABLE (PAT) | 0x00 | ASSIGNS PROGRAM NUMBERS AND PROGRAM MAP TABLE PIDs |
| PROGRAM MAP TABLE (PMT) | ASSIGNED BY PAT | SPECIFIES PIDs FOR COMPONENTS OF MORE THAN ONE PROGRAMS |
| NETWORK INFORMATION TABLE (NIT) | ASSIGNED BY PAT | PHYSICAL NETWORK PARAMETERS SUCH AS FDM FREQUENCIES AND REPEATER NUMBERS |
| CONDITIONAL ACCESS TABLE (CAT) | 0x01 | ASSIGNS UNIQUE PID VALUES TO MORE THAN ONE (PRIVATE) EMM STREAMS, RESPECTIVELY |

FIG. 11

| SYNTAX | NUMBER OF BITS | MNEMONIC |
|---|---|---|
| program_association section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     transport_stream_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     for(i=0; i<N;i++) { | | |
|         program_number | 16 | uimsbf |
|         reserved | 3 | bslbf |
|         if(program number == '0') { | | |
|             network_PID | 13 | uimsbf |
|         } | | |
|         else { | | |
|             program_map_PID | 13 | uimsbf |
|         } | | |
|     } | | |
|     CRC32 | 32 | rpchof |
| } | | |

FIG. 12

| VALUE | DESCRIPTION |
|---|---|
| 0x00 | PROGRAM ASSOCIATION SECTION |
| 0x01 | CONDITIONAL ACCESS SECTION (CA SECTION) |
| 0x02 | PROGRAM MAP SECTION |
| 0x03-0x3F | ITU-T RECOMMENDATION H.222.0 | ISO/IEC 13818 RESERVED |
| 0x40-0xFE | USER PRIVATE |
| 0xFF | INHIBITED |

FIG. 14

| SYNTAX | NUMBER OF BITS | MNEMONIC |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for(i=0; i<N;i++) { | | |
|         descriptor() | | |
|     } | | |
|     for(i=0; i<N;i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for(i=0; i<N2; i++) { | | |
|             descriptor() | | |
|         } | | |
|     } | | |
|     CRC32 | 32 | rpchof |
| } | | |

FIG. 15

| SYNTAX | NUMBER OF BITS | MNEMONIC |
|---|---|---|
| CA_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     reserved | 18 | bslbf |
|     version_number | 5 | uimsbf |
|     current_next_indicator | 1 | bslbf |
|     section_number | 8 | uimsbf |
|     last_section_number | 8 | uimsbf |
|     for(i=0; i<N;i++) { | | |
|         descriptor() | | |
|     } | | |
|     CRC32 | 32 | rpchof |
| } | | |

FIG. 17

| TABLE id | SECTION SYNTAX INDICATOR | '0' | | SECTION LENGTH | | VERSION NUMBER | CURRENT NEXT INDICATOR | SECTION NUMBER | LAST SECTION NUMBER | N LOOP DESCRIPTOR | CRC 32 |
|---|---|---|---|---|---|---|---|---|---|---|---|
| 8 | 1 | 1 | 2 | 12 | 18 | 5 | 1 | 8 | 8 | | 32 |

FIG. 18

| SYNTAX | NUMBER OF BITS | MNEMONIC |
|---|---|---|
| CA_descriptor() { | | |
|     descriptor_tag | 8 | uimbf |
|     descriptor_length | 8 | uimsbf |
|     CA_system_ID | 16 | uimsbf |
|     reserved | 3 | bslbf |
|     CA_PID | 13 | uimsbf |
|     for(i=0; i<N; i++) { | | |
|         private_data_byte | 8 | uimsbf |
|     } | | |
| } | | |

FIG. 19

DATA MULTIPLEXING DEVICE, PROGRAM DISTRIBUTION SYSTEM, PROGRAM TRANSMISSION SYSTEM, PAY BROADCAST SYSTEM, PROGRAM TRANSMISSION METHOD, CONDITIONAL ACCESS SYSTEM, AND DATA RECEPTION DEVICE

This is a continuation of copending International Application PCT/JP98/03127 having an international filing date of 13 Jul. 1998. U.S. application Ser. Nos. 09/589,593 and 09/589,822 are divisional applications of this application. U.S. application Ser. Nos. 11/145,890, 11/145,891, 11,145, 898, and 11/146,974 are continuations of 09/589,593.

TECHNICAL FIELD

The present invention relates to a data multiplexing device, a program distribution system, a program transmission system, a pay broadcast system, a program transmission method, a conditional access system, and a data reception device and is preferably applied to, for example, a data multiplexing device and a data reception device for a digital broadcast system which performs compression-coding and multiplexing of video data and audio data for transmission.

BACKGROUND ART

Recently, a digital broadcast system has been proposed which uses MPEG2 (Moving Picture Experts Group Phase 2) to compress and encode video data and audio data and then broadcasts encoded streams of data over a ground wave or a satellite wave. This digital broadcast system generates a plurality of transport packets for a plurality of programs each consisting of encoded video streams and encoded audio streams by dividing elementary data such as video data or audio data of each program into a predetermined number of bytes and appending a header to the beginning of each block of divided data. Then these transport packets are multiplexed to broadcast them over a ground wave or a satellite wave.

When a reception device receives transmitted data, that is, multiplexed transport packets, it can obtain the encoded video streams and encoded audio streams of each program by reading out the header information of each transport packets from the received data and restoring the original unmultiplexed elementary data based on the header information.

In such a digital broadcast system, a program generally consists of a plurality of data elements (video data and audio data for a plurality of channels). Therefore, for such a digital broadcast system, it is desirable that an audience should subscribe for each data element contained in a program. For example, suppose that a program consists of a total of four types of data elements, that is, video data, main audio data, subaudio data, and additional data. For a prior digital broadcast system, an audience had to subscribe for each program, that is, all of six data elements. Accordingly, even if a recipient wanted to subscribe only for video data and main audio data, he or she had to subscribe for also unnecessary elements (subaudio and additional data).

Moreover, since a prior scramble device was used before multiplexing, the apparatus must include a scramble device for each program and was unavoidably made large.

In addition, a prior digital broadcast system multiplexed program subscription information and cryptanalytic keys into programs at certain intervals and then transmitted them. Since the highest bit rate of multiplexed streams is limited, the transmission rate may not be sufficiently high for a program due to the transmission of such program subscription information and cryptanalytic keys. Therefore, there was a problem that if a sufficient transmission rate could not be ensured, a transmission buffer for buffering any program data might overflow.

DISCLOSURE OF THE INVENTION

The present invention has been devised in light of the foregoing and proposes a digital broadcast system which allows a recipient to receive only necessary data elements among the data elements constituting a program, that is, which can scramble each data element.

The present invention proposes a digital broadcast system which can minimize the device configuration by avoiding provision of a scramble device for each program.

The present invention proposes a digital broadcast system which can avoid any overflow from a transmission buffer for buffering any program data.

In order to solve such problems, the present invention provides a data multiplexing device which multiplexes and transmits the transport stream packets of program data consisting of a plurality of data elements constructed in the form of transport stream packets. The data multiplexing device comprises a scramble key generation means for generating a scramble key corresponding to a data element and a scramble means for scrambling the corresponding transport stream packet of data element by using a scramble key generated by the scramble key generation means, so that the data multiplexing device may generate a scramble key corresponding to one or more data elements among the plurality of data elements constituting a program and scramble each data element.

By scrambling each data element, an audience can subscribe for each data element.

The present invention provides a program distribution system for distributing a program consisting of a plurality of data elements, which not only manages subscribers' subscriptions for each program or data element through a subscriber management system but generates for each data element a scramble key used for descrambling the data elements contained in the program and based on the generated scramble key, selectively scrambles each data element with respect to encoded data elements contained in a multiplexed stream, so that an audience can subscribe for each data element.

The present invention provides a program transmitting system for transmission a program consisting of a plurality of data elements, which in order for a subscriber to watch and/or hear only programs and data elements for which the subscriber has subscribed, generates a plurality of scramble keys used for scrambling the plurality of data elements contained in the program, selectively scrambles each data element based on the generated scramble key, and multiplexes the scrambled data elements for transmission, so that an audience can subscribe for each data element and descramble only thus subscribed data elements to watch and/or hear them.

The present invention provides a pay broadcast system for broadcasting a program consisting of a plurality of data elements, which not only manages subscribers' subscriptions for each program or data element through a subscriber management system but generates for each data element a scramble key used for descrambling the data elements contained in the program and based on the generated scramble key, selectively scrambles each data element with respect to encoded data elements contained in a multiplexed stream, so that an audience can subscribe for each data element.

The present invention provides a conditional access system for providing a conditional access to only subscribed programs or data elements among a plurality of programs distributed by a program distribution system or a plurality of data elements constituting the programs, which, from a plurality of transport stream packets containing a plurality of encryption scramble keys, filters any transport stream packet containing an encryption scramble key associated with a program or data element subscribed for by a recipient, deciphers the plurality of encryption scramble keys contained in the plurality of filtered transport stream packets, generates a plurality of deciphered scramble keys, and descrambles each data element by using a plurality of deciphered scramble keys corresponding to a plurality of data elements, so that an audience can subscribe for each data element and descramble only thus subscribed data elements to watch and/or hear them.

According to the present invention, by scrambling each multiplexed transport stream packet with the respectively corresponding scramble key, the circuit configuration for scrambling can be made simpler than that for scrambling each transport stream packet before multiplexing.

The present invention comprises a plurality of buffer memories which store a plurality of data packets constituting a plurality of data elements, a multiplexing means which has a switch means for switching the buffer memories and which time-division multiplexes a plurality of packet data strings to provide an output by sequentially time-division switching the buffer memories with the switch means, and a switch control means which selects, according to an input rate for the packet data strings, the plurality of buffer memories switchable by the switch means. Accordingly, any overflow from a buffer memory for buffering higher priority data elements can be avoided by switchably controlling the switch means to exclude a buffer memory for buffering lower priority information among the plurality of buffer memories, when the input rate is higher than a reference rate.

The present invention provides a data reception device for receiving multiplexed data obtained by multiplexing the transport stream packets of program data consisting of a plurality of data elements constructed in the form of transport stream packets, which comprises a scramble key extract means for extracting from the multiplexed data a scramble key corresponding to each data element and a descramble means for descrambling the transport stream packet for each data element contained in the multiplexed data by using a scramble key extracted by the scramble key extract means, so that each data element can be descrambled separately by descrambling the transport stream packet for each data element corresponding to a scramble key by using the scramble key.

BRIEF DESCRIPTION OF THE DRAWINGS

FIG. 2 is a schematic diagram showing the correspondence between elementary data contained in each program and scramble keys;

FIG. 3 is a schematic diagram showing the correspondence between information to be recorded in transport stream packets and their PID values;

FIG. 4 is a schematic diagram showing the correspondence between transport packet types and their PID values;

FIG. 6 is a schematic diagram showing the syntax for a transport packet;

FIG. 7 is a schematic diagram showing the syntax for a transport packet;

FIG. 8 is a schematic diagram showing the syntax for a transport packet;

FIG. 11 is a schematic diagram showing the correspondence between each table and its PID;

FIG. 12 is a schematic diagram showing the syntax for a program association section;

FIG. 14 is a schematic diagram showing the correspondence between each section and its PID value;

FIG. 15 is a schematic diagram showing the syntax for a program map section;

FIG. 17 is a schematic diagram showing the syntax for a conditional access section;

FIG. 18 is a schematic diagram showing the syntax for a conditional access section;

FIG. 19 is a schematic diagram showing the syntax for a conditional access descriptor;

Best Mode for Carrying Out the Invention

Now, an embodiment of the present invention is described below with reference to the drawings.

Figure 1:
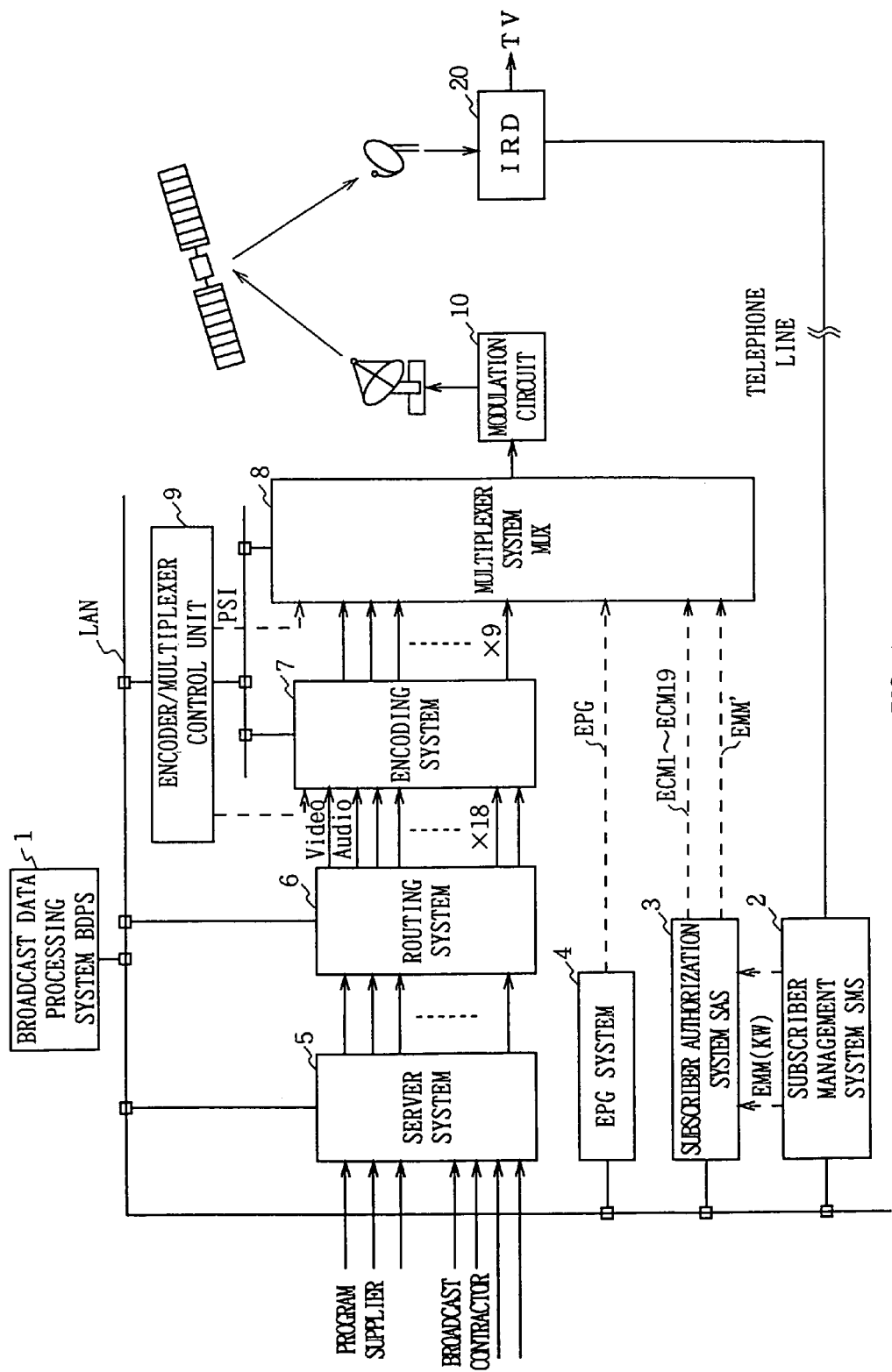
FIG. 1 is a block diagram showing the configuration of a digital broadcast system according to the present invention.

Referring to FIG. 1, a data broadcast system to which a data multiplexing device according to the present invention is applied, is described.

This data broadcast system is a system used for a pay broadcast system such as a satellite digital broadcast system or a ground wave digital broadcast system and as shown in FIG. 1, comprises a broadcast data processing system BDPS (Broadcast_Data_Processing_System) 1, a subscriber management system SMS (Subscriber_Management_System) 2, a subscriber authorization system SAS (Subscriber_Authorization_System) 3, an EPG (Electronic_Program_Guide) system 4, a server system 5, a routing system 6, an encoding system 7, a multiplexer system 8, an encoder/multiplexer control unit 9, and a modulation circuit 10.

The broadcast data processing system 1 is a system for controlling all systems and devices provided within a broadcast station such as the subscriber management system 2, the subscriber authorization system 3, the EPG system 4, the server system 5, the routing system 6, the encoding system 7, the multiplexer system 8, the encoder/multiplexer control unit 9, and the modulation circuit 10. This broadcast data processing system 1 has program planning tables registered with itself, which are used for managing air times for every material including program and promotion materials supplied by program suppliers and program and CM materials produced by the station itself. The broadcast data processing system 1 controls each device and system according to the program planning tables. Such a program planning table consists of a service information file which contains information for program suppliers, an event information file which contains program schedules recorded on a one-hour or one-day basis, and an operation information file which contains program time schedules recorded on a 15-sec basis.

The subscriber management system 2 is a system used for managing subscriber management information such as subscriber registration information and tolling information. Specifically, the subscriber management system 2 is a core system in a pay broadcast system, which has major functions such as subscription, accounting, and billing. In addition, the subscriber management system 2 has another function for managing information on keys such as a scramble key Ks for scrambling a data element and a work key Kw for enciphering such a scramble key Ks as well as information on broadcast contractors, program suppliers, and programming agencies. The subscriber management system 2 has still another function for processing, in real time, audience information supplied by an IRD provided at the receiving end through a telephone line. The subscriber management system 2 eventually provides to the subscriber authorization system 3 described later, some EMM (Entitlement Management_Message) data which contains information on subscription as well as a work key Kw. Such EMM data will be described later in detail.

The subscriber authorization system 3 generates an enciphered work key Kw' by enciphering a work key Kw contained in the EMM data received from the subscriber management system 2 through a predetermined encryption algorithm using a master key Km. It should be appreciated that an encryption algorithm used for a digital broadcast system according to the present invention is an encryption algorithm called CRYPS (a trademark of SONY) developed by the present applicant, which adopts a block encryption technique similar to the DES system established by the Department of Commerce. The subscriber authorization system 3 replaces a work key Kw contained in the EMM data supplied by the subscriber management system 2 with a work key Kw' enciphered through the encryption algorithm CRYPS and then generates thus enciphered EMM data. In order to transmit such EMM data enciphered through the present applicant's unique encryption algorithm via satellites, the subscriber authorization system 3 translates the enciphered EMM data into transport stream packets by inserting the enciphered EMM data in the payload section of a transport stream packet. In the following description, a transport stream packet containing such EMM data will be referred to as an EMM packet. It should be also appreciated that the subscriber authorization system 3 receives a PID (packet identifier) given to such an EMM packet from the encoder/multiplexer control unit 9 described later over a network.

The subscriber authorization system 3 has a work key table in which 256 work keys (Kw) are associated with work key identification numbers (Kw_No) for identifying these work keys and this work key table can be downloaded into memory of the multiplexer system 8 over a network. The reason why such a work key table is downloaded into the multiplexer system 8 is that the multiplexer system 8 obtains an unenciphered work key Kw from the work key identification numbers (Kw_No) because only enciphered work keys Kw' are transmitted by the subscriber authorization system 3 to the multiplexer system 8.

Moreover, the subscriber authorization system 3 generates a scramble key Ks to scramble each data element contained in a transmitted program. In this regard, the subscriber authorization system 3 generates a different scramble key Ks for each program or for each data element contained therein. For example, as shown in FIG. 2, a scramble key Ks1 is generated for scrambling the video data and main audio data constituting the first program, respectively, a scramble key Ks2 is generated for scrambling the video data and main audio data constituting the second program, a scramble key Ks3 is generated for scrambling the subaudio data of the second program, and a scramble key Ks4 is generated for scrambling the private data of the second program. Which scramble key is assigned to which element of which program can be determined by the subscriber authorization system 3 arbitrarily, depending on the content of the program. For example, as with the fourth program, different scramble keys Ks7 through Ks10 can be assigned to the video data, main audio data, subaudio data, and private data, respectively, or as with the fifth program, the same scramble key Ks11 can be assigned to all the video data, main audio data, subaudio data, and private data.

Moreover, in order to enhance the security level of the encryption/decryption system used for the digital broadcast system, the subscriber authorization system 3 updates these scramble keys Ks1 through Ks19 at intervals of 4 seconds with a random number generator within the subscriber authorization system 3.

In addition, the subscriber authorization system 3 generates a plurality of ECM (Entitlement_Control_Message) data items used for descrambling. This ECM data consists of a work key number for specifying at least a work key Kw listed in the work key table, a scramble key Ks for scrambling data streams, and a CA_system_ID for identifying the subscriber authorization system 3. Therefore, in the example where 19 scramble keys Ks1 through Ks19 are used as shown in FIG. 2, the subscriber authorization system 3 generates 19 ECM data items, because only a scramble key is registered with an ECM data item.

In order to transmit such a plurality of generated ECM data items, the subscriber authorization system 3 further translates the plurality of ECM data items into transport stream packets by inserting the plurality of ECM data items in the payload section of a transport stream packet. In the following description, a transport stream packet containing such ECM data will be referred to as an ECM packet. In FIG. 1, the term ECM1 shows an ECM packet containing the scramble key Ks1, the term ECM2 shows an ECM packet containing the scramble key Ks2, and similarly, the terms ECM3 through ECM19 show ECM packets containing the scramble keys Ks3 through Ks19, respectively. It should be also appreciated that the subscriber authorization system 3 receives a PID (packet identifier) given to each of the plurality of ECM packets from the encoder/multiplexer control unit 9 described later over a network. It should be further appreciated that in FIG. 1, the ECM packets are shown to be supplied directly to the multiplexer system but this is only for the sake of clarity and in fact the ECM packets will be supplied to the multiplexer system 8 via a network and the encoder/multiplexer control unit 9.

Now, why the above-mentioned work keys and scramble keys are to be used for the digital broadcast system is described below.

A typical digital broadcast system generally uses a pay broadcast system which authorizes only subscribers to watch and/or hear the programs and sends accounts to those subscribers based on their subscription conditions. To accomplish a pay broadcast system, such a digital broadcast system must scramble programs with scramble keys generated by the broadcast station before transmission and allow only subscribers to descramble the programs to watch and/or hear them. Specifically, in order to allow only subscribers to descramble such scrambled data elements at the receiver end, scramble keys Ks used in scrambling must be used also for descrambling. To automatically descramble programs transmitted via satellites, these scramble keys Ks must be transmitted to the receiver end.

However, if these scramble keys Ks are to be transmitted to the receiver end, an unauthorized recipient may be able to obtain these scramble keys Ks and consequently to watch and/or hear all transmitted programs free of charge. Therefore, at the first level of security, the pay broadcast system according to the present invention changes these scramble keys Ks at intervals of several seconds with a random number generator and enciphers these scramble keys Ks with work keys Kw. The encryption of scramble keys Ks with a random number generator can be accomplished by software and therefore, can provide a much higher level of security for the encryption technique.

To further enhance the security level of a conditional access system, the digital broadcast system according to the present invention enciphers these scramble keys Ks by using work keys Kw in an encryption circuit 822 of the multiplexer system 8 which is described later and then transmits enciphered scramble keys Ks' to the receiver end. That is, the security level can be enhanced to the utmost by transmitting enciphered scramble keys. Ks rather than by transmitting the scramble keys Ks themselves used in scrambling programs. At the receiver end, a decrypter for deciphering the enciphered scramble keys Ks' is provided in a security module (IC card) in the receiver and all decryption operations are performed in the security module. The security module composed of an IC card has such a structure that the program code contained therein cannot be decoded in effect and therefore, it may be quite difficult for an outsider to decipher the scramble keys.

The EPG system 4 is a system to create program guide data associated with transmitted programs. Program guide data (EGP data) refers to, for example, data for informing air times of programs to be broadcasted in future, character data for explaining the contents of selected programs, and title data for programs. The EPG data may be created mainly by the broadcast station or a program supplier may create special EPG data for its own programs.

The server system 5 consists of a server constructed by connecting disk drives containing various materials into an array and a server control computer for controlling the recording/playback operations of the server. The server system 5 is connected to the broadcast data processing system 1 through the LAN in the broadcast station such as Ethernet, so that it can be controlled to transmit programs according to a program planning list of the program data processing system. The server system 5 has several server functions corresponding to the types of materials recorded therein, such as a CM server function for supplying CM materials, a daily server function for supplying television program materials and news program materials, and a video-on-demand (VOD) server function for supplying television program materials and movie materials, and can provide a plurality of desired programs over a certain channel under the control of the broadcast data processing system 1.

The routing system 6 is a system for routing multichannel data supplied by the server system 5 to appropriate channels. The routing system 6 is connected to the broadcast data processing system 1 through Ethernet, so that it can be controlled to transmit programs over appropriate channels according to a program planning list of the program data processing system.

The encoder/multiplexer control unit 9 supplies control commands to control the encoding system 7 and the multiplexer system 8 to the encoding system 7 and the multiplexer system 8 via a network. The encoder/multiplexer control unit 9 receives an EPG packet from the EPG system 4 via the network as well as ECM packets (ECM1 through ECM19) and an EMM' packet from the subscriber authorization system 3 via the network and then supplies the received EPG, EMM', and ECM packets to the multiplexer system 8. In addition, the encoder/multiplexer control unit 9 supplies private data to the encoding system 7 as well as program specific information (PSI: Program_Specific_Information) to the multiplexer 8.

Program specific information PSI consists of a program association table (PAT: Program_Association_Table) for showing a specified program number and its corresponding transport stream packet in a program map table (PMT), a program map table (PMT: Program_Map_Table) for showing a transport stream packet in which data elements for the specified program are described, and a conditional access table (CAT: Conditional_Access_Table) for specifying a transport stream packet containing EMM data. The encoder/multiplexer control unit 9 generates a program association table PAT, a program map table PMT, and a conditional access table CAT and provides these generated tables in the form of a transport stream. In the following description, a transport stream packet containing such a program association table PAT will be referred to as a PAT packet, a transport stream packet containing such a program map table PMT will be referred to as a PMT packet, and a transport stream packet containing such a conditional access table CAT will be referred to as a CAT packet.

In order to assign appropriate packet identifiers PID to transport stream packets created by the EPG system 4, the subscriber authorization system 3, and the encoding system 7, the encoder/multiplexer control unit 9 generates the appropriate packet identifiers PID and supplies them to the subscriber authorization system 3, the EPG system 4, and the encoding system 7.

A packet identifier (PID: Packet Identification) is an identifier for identifying a transport stream packet. Such a packet identifier PID is unique data of 13 bits determined according to the type of data stored in the payload of a transport stream packet. For example, as shown in FIG. 3, a PID value of "0x0000" is specified for a transport stream packet which stores information on a program association table PAT in its payload, and a PID value of "0x0001" is specified for a transport stream packet which stores information on a conditional access table CAT in its payload. One of the PID values "0x0020" through "0x1FFE" is selected as a PID value for a transport stream packet which stores information on a program map table PMT or elementary data such as video data and audio data in its payload.

When generating a PID to be assigned to each transport stream packet, the encoder/multiplexer control unit 9 generates a PID table showing the correspondence between PIDs specified for transport stream packets and scramble keys Ks used for scrambling. The PID table is a table for storing the previously used PID values and by referring to the PID values stored in the PID table, the encoder/multiplexer control unit 9 can determine whether a PID value has been used previously and generate a new PID value which is not a duplicate of any previous PID value. The PID table is used also for determining whether a multiplexed transport stream packet should be scrambled.

For example, as shown in FIG. 4, the PID table shows the correspondence between PIDs specified for generated transport stream packets and scramble keys Ks used for data stored in the corresponding transport stream packets. In FIG. 4, a PID value for PAT packets is fixed to "0x0000", a PID value specified for PMT packets corresponding to the first program is "0x0100", a PID value specified for PMT packets corresponding to the second program is "0x0101", a PID value specified for ECM packets with a scramble key Ks1 for scrambling Video[1] packets used for video data of the first program and Main_Audio[1] packets used for main audio data is "0x0300", a PID value specified for ECM packets with a scramble key Ks2 for scrambling Video[2] packets used for video data of the second program is "0x0301", a PID value specified for ECM packets with a scramble key Ks2 for scrambling Main_Audio[2] packets used for main audio data of the second program is "0x0302", a PID value specified for ECM packets with a scramble key Ks3 for scrambling Sub_Audio[2] packets used for subaudio data of the second program is "0x0303", and a PID value specified for ECM packets with a scramble key Ks4 for scrambling Private[2] packets used for private data of the second program is "0x0304". A PID value specified for Video[1] packets used for video data of the first program is "0x0500" and this type of packets are scrambled with a scramble key Ks1. A PID value specified for Main_Audio[1] packets used for main audio data of the first program is "0x0501" and this type of packets are scrambled with a scramble key Ks1. A PID value specified for Video[2] packets used for video data of the second program is "0x0502" and this type of packets are scrambled with a scramble key Ks2. A PID value specified for CAT packets is fixed to "0x0001" and a PID value specified for EMM packets is "0x700".

Figure 5:
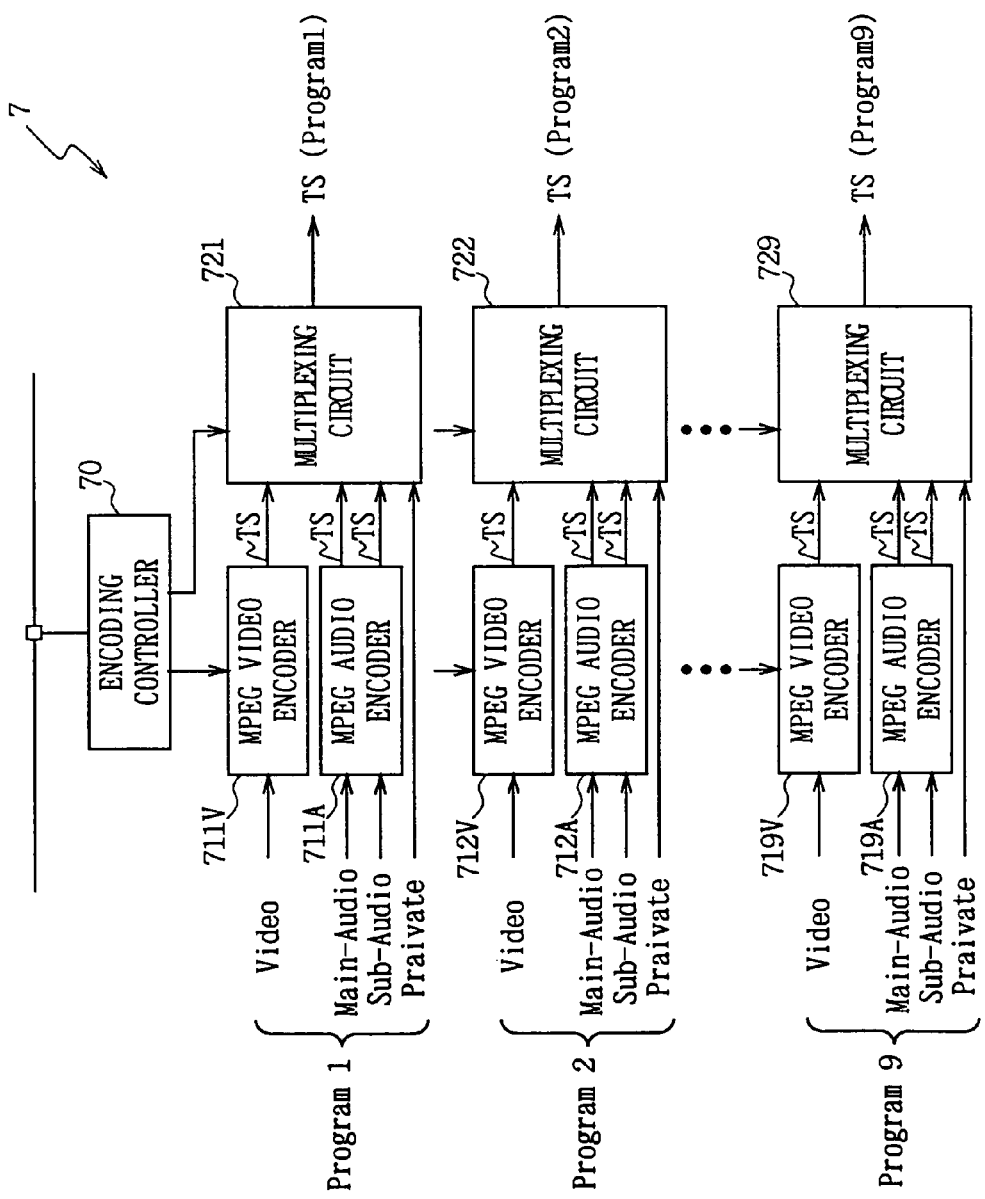
FIG. 5 is a block diagram showing the configuration of an encoding system.
Figure 9:
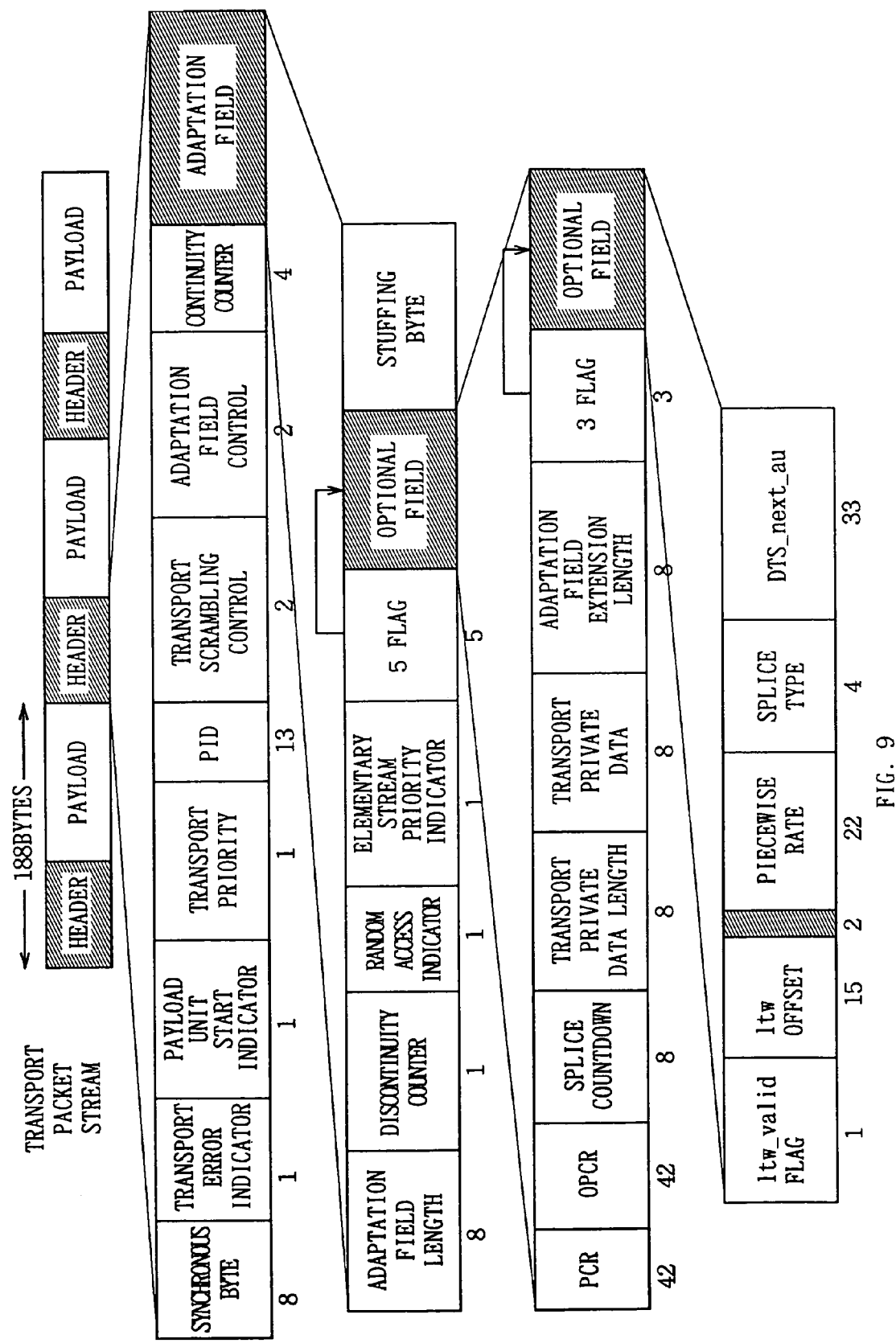
FIG. 9 is a schematic diagram showing the syntax for a transport packet.

As shown in FIG. 5, the encoding system 7 comprises a plurality of MPEG video encoders 711V through 719V for encoding video data supplied over a plurality of channels according to the MPEG2 standard, MPEG audio encoders 711A through 719A for encoding a plurality of audio data streams corresponding to the video data streams according to the MPEG2 standard, multiplexing circuits 721 through 729 for multiplexing streams supplied by each video encoder and each audio encoder and private data streams supplied by the encoder/multiplexer control unit 9, and an encoding controller 70 for controlling the video/audio encoders 711 through 719 and the multiplexing circuits 721 through 729. It should be appreciated that the encoding system as shown in FIG. 5 is configured to encode programs for 9 channels but, of course, it may handle not only 9 channels but any number of channels.

Each of the video encoders 711V through 719V generates encoded bit streams by encoding video data according to the MPEG2 standard. Then the video encoder generates PES (Packetized Elementary Stream) packets by dividing an encoded bit stream in picture units and appending a header to the divided bit stream. Next, the video encoder generates transport stream packets by dividing a PES packet in 184 bytes and appending a header of 4 bytes to the divided bit stream of 184 bytes. Data consisting of transport stream packets arranged in a stream is called a transport stream. In generating transport stream packets, the encoder/multiplexer control unit 9 supplies to each of the video encoders 711V through 719V a packet identifier (PID) for identifying a transport stream packet containing the encoded video data.

Each of the audio encoders 711A through 719A generates encoded bit streams by encoding main audio data and subaudio data according to the MPEG2 standard. Like the video encoders, each of the audio encoders 711A through 719A generates PES packets from the bit streams and then generates transport stream packets containing audio data by dividing a PES packet in 184 bytes and appending a header of 4 bytes. In generating transport stream packets, the encoder/multiplexer control unit 9 supplies to each of the audio encoders 711A through 719A a packet identifier (PID) for identifying a transport stream packet containing the encoded audio data.

Each of the multiplexing circuits 721 through 729 generates a transport stream by multiplexing a transport stream containing encoded video data, a transport stream containing encoded audio data, and a transport stream containing private data. Specifically, the multiplexing circuit multiplexes these streams by switching between the transport stream containing encoded video data, the transport stream containing encoded audio data, and the transport stream containing private data in units of transport stream packets. Therefore, in an output transport stream, transport stream packets containing encoded video data, transport stream packets containing encoded audio data, and transport stream packets containing private data are intermingled. In this regard, private data is placed in a transport stream packet by the encoding controller 70 and then supplied to each of the multiplexing circuits through a network.

The encoding controller 70 specifies an appropriate encoding bit rate for each of the video and audio encoders. For example, the encoding controller 70 assigns a higher bit rate to an encoder for encoding a program such as sports which requires more encoded bits and assigns a lower bit rate to an encoder for encoding a program such as news which may generate fewer encoded bits. That is, it grasps a complexity (which is used as an index of how many bits are generated by encoding) of video data for each channel relative to the other channels and then assigns the highest bit rate to a channel for video data of the highest complexity and assigns other lower bit rates in descending order. Of course, any assigned bit rate is not program-specific and may be changed depending on the complexity of video data in that program.

Next, the structure and syntax for this transport stream packet are described below in detail with reference to FIGS. 6 through 9.

A transport stream packet consists of a header of 4 bytes and a payload section of 184 bytes for storing various types of data and data elements.

The header of a transport stream packet consists of the following fields: sync_byte, transport_error_indicator, payload_unit_start_indicator, transport_priority_PID, transport_scrambling_control, adaptation_field_control, continuity_counter, and adaptation_field.

The sync_byte field is a field having a fixed length of 8 bits and detects a synchronous pattern in the bit stream. This field is defined to have a fixed value of "101000111", (0x47) and can detect a synchronous condition by detecting this bit pattern in the stream.

The transport_error_indicator field is a flag of 1 bit and when set to "1", indicates that an uncorrectable error of at least 1 bit exists in the transport stream packet.

The payload_unit_start_indicator field is a flag of 1 bit and has a meaning significant to transport stream packets which carry video/audio data and other elementary data or program specific information (PSI). If the payload section of a transport stream packet contains elementary data, the payload_unit_start_indicator field has the following meaning: when the payload_unit_start_indicator field is "1", it indicates that elementary data is inserted at the beginning of the payload section of this transport stream packet; when the payload_unit_start_indicator field is "0", it indicates that elementary data is not inserted at the beginning of the payload section of this transport stream packet. If the payload_unit_start_indicator field is set to "1", it indicates that only one PES packet starts at a certain transport stream packet. On the contrary, if the payload section of a transport stream packet contains PSI data, the payload_unit start_indicator field has the following meaning: when the transport packet carries the first byte of the PSI section, the payload_unit_start_indicator field is "1"; when the transport stream packet does not carry the first byte of the PSI section, the payload_unit_start_indicator field is "0". If the transport stream packet is a null packet, the payload_unit_start_indicator field is also "0".

The transport_priority field is an identifier of 1 bit for indicating the priority of a transport packet. When the transport_priority field is set to "1", this transport packet is a packet having the same packet identifier PID, which indicates that this packet has a higher priority than that having the transport_priority field set to a value other than "1". For example, a certain packet in an elementary stream can be assigned a priority by setting a packet identifier of the transport_priority field.

The transport_scrambling_control field is data of 2 bits for indicating the scrambling mode of the transport stream packet payload. The scrambling mode indicates whether data stored in the payload has been scrambled and the type of scramble. It is required by the standard that the transport stream packet header and the adaptation field should not be scrambled with a scramble key Ks. Therefore, by using this transport_scrambling_control field, it can be determined whether data stored in the transport stream packet payload has been scrambled.

The adaptation_field_control field is data of 2 bits for indicating that an adaptation field and/or payload is placed at the packet header of this transport stream. Specifically, if only payload data is placed at the packet header, the adaptation_field_control field is "01"; if only an adaptation field is placed at the packet header, the adaptation_field_control field is "10"; if both an adaptation field and a payload are placed at the packet header, the adaptation_field_control field is "11".

The continuity_counter field is data for indicating whether continuously transmitted packets with the same PID are partially absent or discarded during the transmission. Specifically, the continuity_counter field is a field of 4 bits to be incremented each time a transport stream packet with the same PID is transmitted. However, it should be appreciated that this continuity_counter is counted only when an adaptation field is placed at the packet header.

The adaptation_field is a field for inserting additional information on separate streams or stuffing bytes as an option. By using this adaptation field, every information on dynamic state transitions of separate streams can be transmitted together with data.

The adaptation_field consists of the following fields: adaptation_field_length, discontinuity_counter, random_access_indicator, elementary_stream_priority_indicator, PCR_flag, OPCR_flag; splicing_point_flag, splicing_point, transport_private_data_flag, adaptation_field_extension_flag, program_clock_reference (PCR), original_program_clock_reference (OPCR), splice_countdown, transport_private_data_length, private_data, adaptation_field_extension_length, ltw_flag (legal time_window flag), piecewise rate_flag, and seamless_splice_flag.

The adaptation_field_length field is data indicating the number of bytes of an adaptation field following this adaptation_field_length field. If the adaptation_field_control field is "11", the adaptation_field_length is 0 through 182 bits; if the adaptation_field control is "10", the adaptation_field_length is 183 bits. It should be appreciated that stuffing is required to fill in with some bits when elementary streams are not enough to fill in the payload of a transport stream.

The discontinuity_counter field is data indicating whether a system clock reference (SCR) is reset in the middle of a plurality of packets with the same PID to be discontinuous. If the system clock reference is discontinuous, this discontinuity_counter field is "1"; if the system clock reference is still continuous, this discontinuity_counter field is "0". It should be appreciated that the system clock reference is reference information which an MPEG decoder for decoding video and audio data uses to set a system time clock for the decoder to a timing value intended by the encoder.

The random_access_indicator field is data indicating the beginning of a video sequence header or an audio frame. That is, this random_access_indicator field is data indicating an access point (which is the beginning of a frame) for video or audio data when data elements are accessed randomly.

The elementary_stream_priority_indicator field is data indicating the priority of elementary stream data carried in the payload of this transport stream packet in packets with the same PID. For example, when video data of an elementary stream is intra-coded, the elementary_stream_priority_indicator field is set to "1". On the contrary, the elementary_stream_priority_indicator of a transport stream containing inter-coded video data is set to "0".

The PCR_flag field is data indicating whether PCR (program_clock_reference) data exists in an adaptation field. If PCR data exists in the adaptation field, the PCR_flag field is set to "1"; if no PCR data exists, the PCR_flag field is set to "0". It should be appreciated that the PCR data is used by a decoder at the receiver end to obtain a proper timing of a decoding operation for decoding transmitted data.

The OPCR_flag field is data indicating whether OPCR (original_program_clock_reference) data exists in an adaptation field. If OPCR data exists in the adaptation field, the OPCR_flag field is set to "1"; if no OPCR data exists, the OPCR_flag field is set to "0". It should be appreciated that the OPCR data is used by a splicing operation to reconstruct a transport stream from a plurality of original transport streams and indicates PCR data for an original transport stream.

The splicing_point_flag field is data indicating whether splice_countdown data exists in an adaptation field to show an edit point (splice point) at the transport level. If splice_countdown data exists in the adaptation field, the splicing_point_flag field is "1"; if no splice_countdown data exists in the adaptation field, the splicing_point_flag field is "0".

The transport_private_data_flag field is data indicating whether private data used to describe certain user data exists in an adaptation field. If private data exists in the adaptation field, the transport_private_data_flag field is set to "1"; if no private data exists in the adaptation field, the transport_private_data_flag field is set to "0".

The adaptation_field_extension_flag field is data indicating whether an extension field exists in an adaptation field. If an extension field exists in the adaptation field, the adaptation_field_extension_flag field is set to "1"; if no extension field exists in the adaptation field, the adaptation_field_extension_flag field is set to "0".

The program_clock_reference (PCR) is a reference clock to be referenced when the clock at the receiver end is made in phase with the clock at the transmitting end. This PCR data contains time data when each transport packet is generated. The PCR data is 42 bits long, consisting of program_clock_reference_base of 33 bits and program_clock_reference_extension of 9 bits. 24 hours can be counted by counting the system clock in the range of 0 through 299 with the program_clock_reference_extension and adding a bit to the program_clock_referece_base with a carry generated when the count 299 is reset to 0.

The original_program_clock_reference (OPCR) field is data used to reconstruct a single program transport stream from certain transport streams. When such a single program transport stream is completely reconstructed, the original_program_clock_reference is copied into the program_clock_reference field.

The splice_countdown field is data indicating the number of packets necessary to reach an editable (spliceable) point at the transport stream packet level in transport stream packets with the same PID. Therefore, a transport stream packet at an editable splicing point has the splice_countdown field set to "0". In a transport packet with the splice_countdown field set to "0", the last byte of the transport stream packet payload can be spliced by relocating it to the last byte of an encoded picture.

In this regard, a splicing operation is performed to concatenate two different elementary streams at the transport level to form a new transport stream. Splicing operations can be divided into two types: a seamless splice with no discontinuity of decoding and a nonseamless splice with a discontinuity of decoding. The case where no discontinuity of decoding occurs means that the decoding time for an access unit of a newly added stream is consistent with the decoding time for an access unit of an old stream before splicing. On the contrary, the case where a discontinuity of decoding occurs means that the decoding time for an access unit of a newly added stream is inconsistent with the decoding time for an access unit of an old stream before splicing.

The transport_private_data_length field is data indicating the number of bytes of private data in an adaptation field.

The private_data is a field which is not required specifically by the standard but can be used to describe certain user data in an adaptation field.

The adaptation_field_extension_length field is data indicating the length of adaptation field extension data in an adaptation field.

The ltw_flag (legal time_window_flag) field is data indicating whether ltw_offset data showing an offset value of the display window exists in an adaptation field.

The piecewise_rate_flag field is data indicating whether piecewise_rate data exists in an adaptation field.

The seamless_splice_flag field is data indicating whether the splicing point is a normal splicing point or a seamless splicing point. When the seamless_splice_flag field is "0", it indicates that the splicing point is a normal splicing point; when the seamless_splice_flag field is "1", it indicates that the splicing point is a seamless splicing point. A normal splicing point means that the splicing point exists at a break in PES packets and that the splicing packet immediately preceding this splicing point ends at the access unit and the next transport packet with the same PID begins at the header of a PES packet. On the contrary, a seamless splicing point means that a splicing point exists in the middle of a PES packet and that in order for the decoding time for an access unit of a newly added stream to be consistent with the decoding time for an access unit of an old stream before splicing, the characteristics of the old stream are partly used as those of the new stream.

Figure 10:
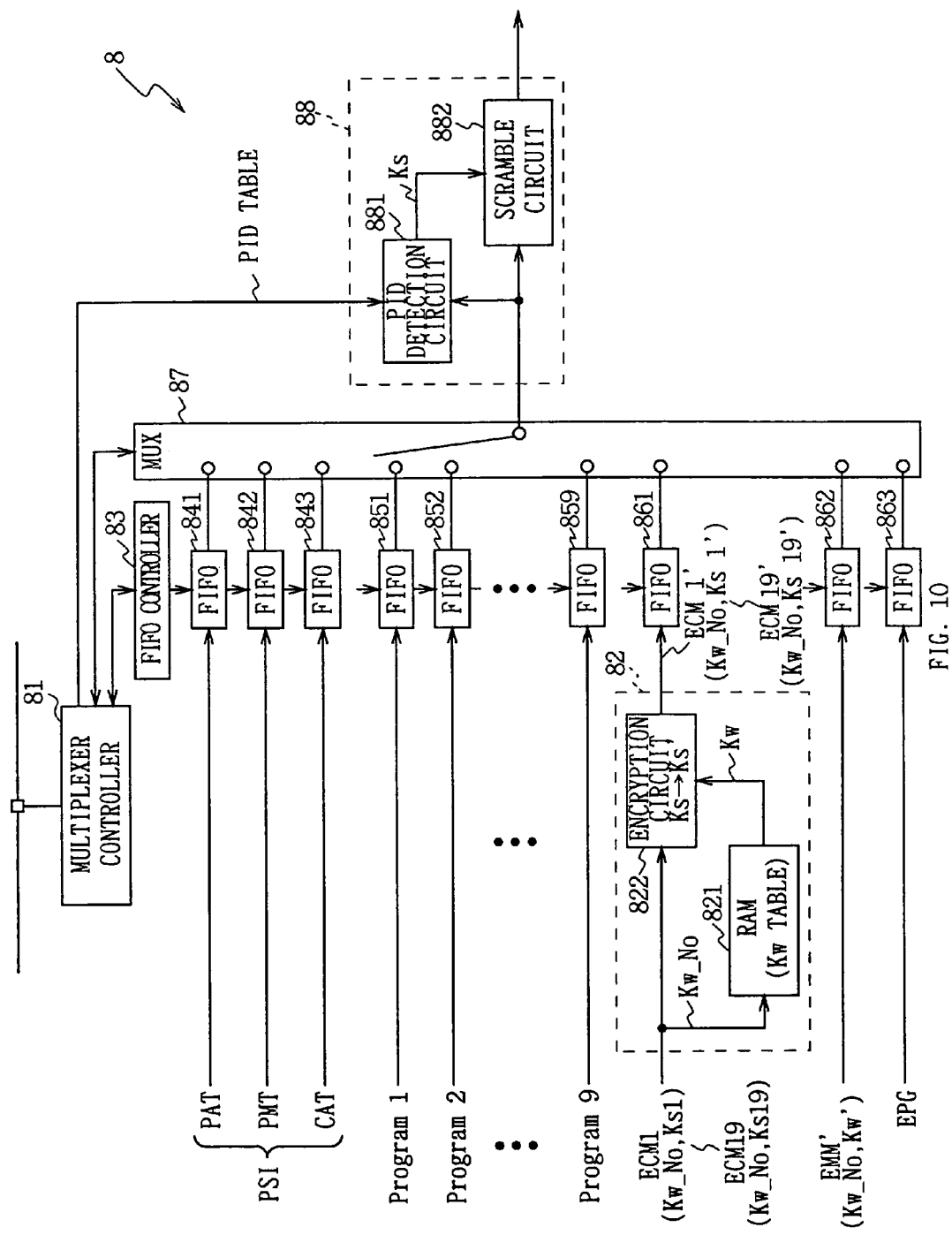
FIG. 10 is a block diagram showing the configuration of a multiplexer system.

Next, the multiplexer system 8 is described below in detail with reference to FIG. 10. The multiplexer system 8 is a system which multiplexes a PAT packet, a PMT packet, a CAT packet, transport stream packets containing encoded elementary data, an EPG packet, ECM packets, and an EMM' packet to generate a transport stream.

Specifically, the multiplexer system 8 comprises a multiplexer controller 81 for controlling all circuits within the multiplexer system 8, an encryption block 82 for enciphering ECM packets supplied by the subscriber authorization system 3, FIFO buffers 841 through 843 for buffering PAT packets, PMT packets, and CAT packets supplied by the encoder/multiplexer system 9 as program specific information PSI, respectively, FIFO buffers 851 through 859 for buffering transport stream packets containing a plurality of programs, respectively, FIFO buffers 861 through 863 for buffering ECM packets, EMM packets, and EPG packets, respectively, an FIFO controller 83 for controlling the read/write operations of each FIFO buffer as well as for monitoring free area of each FIFO buffer, a multiplexing circuit 87 for multiplexing transport stream packets supplied by the FIFO buffers to generate a multiplexed transport stream, and a scramble block 88 for scrambling data elements contained in a multiplexed transport stream packet.

The multiplexer controller 81 receives an EPG packet, an EMM' packet, ECM packets (ECM1 through ECM19), a PAT packet, a PMT packet, and a CAT packet from the encoder/multiplexer control unit 9 and supplies each packet to an appropriate circuit. The multiplexer controller 81 receives also a PID table from the encoder/multiplexer control unit 9 and supplies it to the scramble block 88.

The encryption block 82 is a block for enciphering scramble keys Ks contained in a plurality of ECM packets supplied by the subscriber authorization system 3 through the encoder/multiplexer control unit 9 and the multiplexer controller 81. The encryption block 82 has a RAM 821 for storing a work key table downloaded from the subscriber authorization system 3 before the encryption operation and an encrypter 822 for enciphering the scramble keys Ks contained in the ECMs based on work keys Kw.

Now, the encryption operation of the encryption block 82 is described below by explaining, by way of example, the case where a scramble key Ks1 for scrambling elementary data constituting the first program is to be enciphered. First, a work key number Kw_No contained in an ECM packet ECM1 is supplied to the RAM 821. The RAM 821 stores a work key table downloaded from the subscriber authorization system, which shows the correspondence between work key numbers Kw_No and work keys Kw. Since the work key number Kw_No contained in the packet ECM1 is supplied to the RAM 821, a work key Kw corresponding to the supplied work key number Kw_No is provided by the RAM 821. The encryption circuit 822 receives an ECM packet containing a scramble key Ks1 and also receives a work key Kw from the RAM 821. The encryption circuit 822 enciphers the scramble key Ks1 contained in the source ECM with the work key Kw and then generates an enciphered scramble key Ks1'. The encryption circuit 822 accumulates the enciphered scramble key Ks1' rather than the unenciphered scramble key Ks in the source ECM and provides as an enciphered ECM packet a transport stream packet containing the enciphered scramble key Ks1'. It should be appreciated that the encryption algorithm is the same as that used at the subscriber authorization system 3 for enciphering work keys Kw contained in EMM data, that is, the encryption algorithm CRYSP.

The encryption block 82 supplies to the scramble block 88 a scramble key Ks1 which is supplied as ECM data. It should be appreciated that the scramble key Ks1 to be supplied to the scramble block 88 has not been enciphered with a work key Kw.

In the foregoing example, scramble keys Ks1 accumulated in the first ECM packet ECM are enciphered as described above but the encryption operations for other scramble keys Ks2 through Ks19 are performed identically. Therefore, enciphered ECM packets ECM1' through ECM19' are provided by the encryption block 82 to the FIFO buffer 861 and unenciphered scramble keys Ks1 through Ks19 are also provided by the encryption block 82 to the scramble block 88.

The multiplexing circuit 87 supplies to the scramble block 88 some packets selected from PAT packets, PMT packets, and CAT packets buffered in the FIFO 841 through 843, transport stream packets containing a plurality of programs Program 1 through Program 9 buffered in the FIFO 851 through 859, and ECM packets, EMM packets, and EPG packets buffered in the FIFO 861 through 863, depending on the amount of data in each FIFO. In this regard, the FIFO controller 83 monitors the input rate for packet data supplied to each FIFO and it notifies the multiplexer controller 81 of an excess input rate condition when the sum of all input rates for each FIFO exceeds a predetermined output rate. Thus, the multiplexer controller 81 excludes the FIFO 862 for buffering EMM packets from the target FIFOs to be selected by the multiplexing circuit 87 and then switches the other FIFOs as a selection target to supply to the scramble block 88 packet data from a switched FIFO. Therefore, as the number of FIFOs to be selected by the multiplexing circuit 87 decreases, the number of select operations for a target FIFO increases and thereby the data output rate of each FIFO can be increased correspondingly to the excess input rate condition.

When the sum of all input rates for each FIFO is under a predetermined output rate, the multiplexer controller 81 supplies to the scramble block 88 EMM packets buffered in the FIFO 862 by restoring the FIFO 862 as a target FIFO to be selected by the multiplexing circuit 87. It should be appreciated that EMM data indicating the subscription information buffered in the FIFO 862 may not be changed frequently and substantially no disadvantageous situations will occur even if that FIFO is temporarily excluded from the target FIFOs to be selected by the multiplexing circuit 87.

When the sum of all input rates for each FIFO further increases to such an extent that only the exclusion of the single FIFO 862 from the target FIFOs to be selected by the multiplexing circuit 87 cannot deal with such an excess input rate condition, the multiplexer controller 81 excludes not only the FIFO 862 for buffering EMM data but the FIFO 863 for buffering EPG data. Such an additional exclusion can further decrease the number of FIFOs to be selected by the multiplexing circuit 87 and further increase the number of select operations for a target FIFO and thereby the data output rate of each FIFO can be further increased correspondingly to the excess input rate condition. It should be appreciated that EPG data indicating the program guide information buffered in the FIFO 863 may not be changed frequently and substantially no disadvantageous situations will occur even if that FIFO is temporarily excluded from the target FIFOs to be selected by the multiplexing circuit 87.

The scramble block 88 has a PID detection circuit 881 and a scramble circuit 882. The PID detection circuit 881 receives transport stream packets from the multiplexing circuit 87 as well as a PID table (FIG. 4) from the encoder/multiplexer control unit 9 through the multiplexer controller 81. Since the PID table shows the correspondence between PID values and scramble keys used in generating transport stream packets, the PID detection circuit 881 detects a desired scramble key Ks by referencing the PID values stored in the PID table and then supplies the detected scramble key Ks to the scramble circuit 882. The scramble circuit 882 uses the scramble key Ks supplied by the PID detection circuit 881 to scramble the transport stream packets containing program data associated with this scramble key Ks and provides an output to the modulation circuit 10 (FIG. 1).

Now, the program specific information is described below.

Program specific information (PSI: Program_Specific_Information) is information indicating which data is contained in which packet among the transport stream packets obtained by multiplexing a plurality of programs and data. Therefore, a decoder can decode desired data by referencing this program specific information.

The program specific information can be classified into 4 table structures as shown in FIG. 11. A program association table (PAT: Program_Association_Table) is a table for indicating specified program numbers and their corresponding program map table (PMT) PIDs. A program map table (PMT: Program_Map_Table) is a table for indicating PIDs of packets in which elements of a specified program are described. A network information table (NIT: Network_Information_Table) is a private table for indicating information which is to be used in transmitting network parameters but is not specifically required by any standard. A conditional access table (CAT: Conditional_Access_Table) is a table for assigning unique PIDs to EMM packets. In the following description, the program association table, the program map table, and the conditional access table are described in detail.

Figure 13:
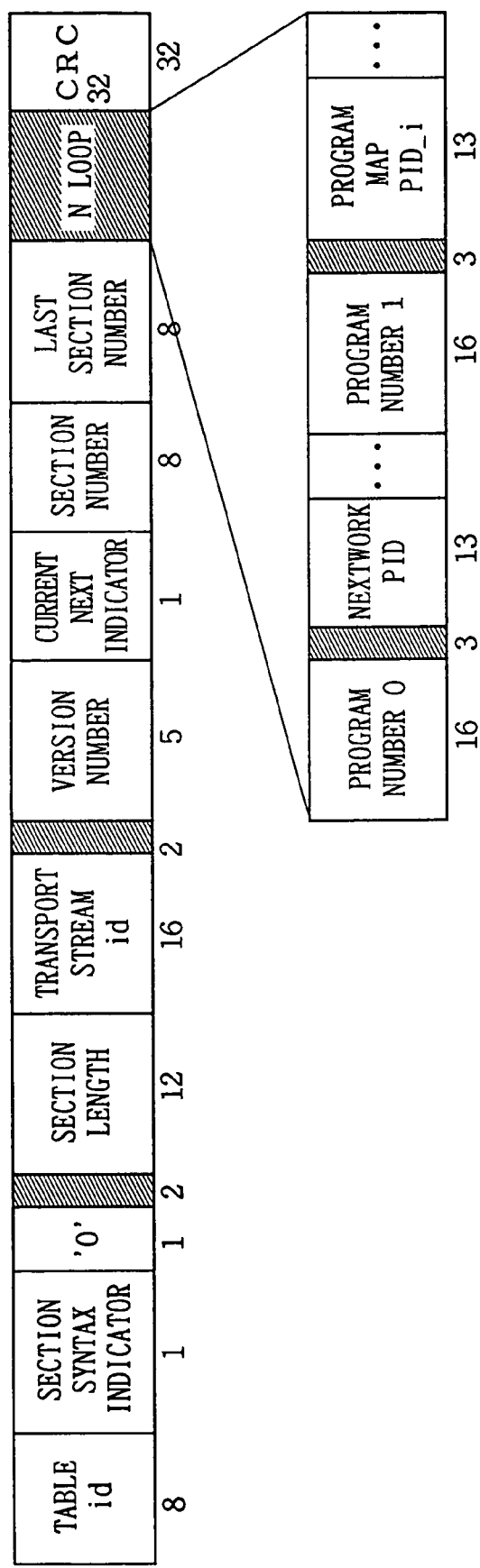
FIG. 13 is a schematic diagram showing the syntax for a program association section.

First, the program association table is described below with reference to FIGS. 12 and 13.

The program association table PAT is a table used to specify each transmitted program and the PID of a transport stream packet which specifies the content of the program. Specifically, the program association table PAT consists of the following: table_id, section_syntax_indicator, section_length, transport_stream_id, version_number, current_next_indicator, section_number, last_section_number, program_number, network_PID, and program_map_PID.

The table_id shows a unique identification number assigned to each table as shown in FIG. 14. The table_id of the program association table PAT is "0x00", the table_id of the conditional access table CAT is "0x01", and the table_id of the program map table PMT is "0x02".

The section_syntax indicator is a constant fixed to "1".

The section_length is a field for indicating in bytes the length from the bit following this section_length to the last byte of the CRC section.

The transport_stream_id is identification data for discriminating between this transport stream and other transport streams multiplexed in the network.

The version_number is data for indicating the version number of the program association table (PAT). The version number is an integer in the range 0 through 31 and incremented by 1 when any setting in the program association table is changed, that is, any characteristic of a transport stream changes. The decoder at the receiver end references the version_number to determine that only the section of the latest version is valid.

The current_next_indicator is data for indicating whether the transmitted program association table is currently available.

The section_number is data for indicating the program association table section number. For example, the section_number of the program_association_section( ) contained in the program association table is set to "0x00" to show that it is the first section.

The last_section_number is data for indicating the section number of the last section among all the sections specified in the program association table. Therefore, the last_section_number allows the system to know the number of sections specified in the program association table.

The program_number is a unique number given to each of a plurality of programs to be multiplexed. For example, in a data transmission device according to the present invention, the program numbers 1 through 9 are assigned to 9 programs to be multiplexed, respectively. The program_number is data which can be defined by the user arbitrarily. However, when the program_number is set to 0, the program_number indicates that a network information table (NIT) exists in the stream.

The network_PID is data for indicating the PID in which a network information table (NIT) in the stream is described. The network information table (NIT) is a table which can be set by the user arbitrarily and is not used for the present device.

The program_map_PID is data for indicating the PID of a transport stream packet having a program map table applied to the program specified by the program_number. For example, if a program consists of a piece of video data and 4 pieces of audio data, a PID which specifies a transport stream packet having the video data of that program and 4 PIDs which specify transport stream packets having the audio data of that program are described in the program association table.

Figure 16:
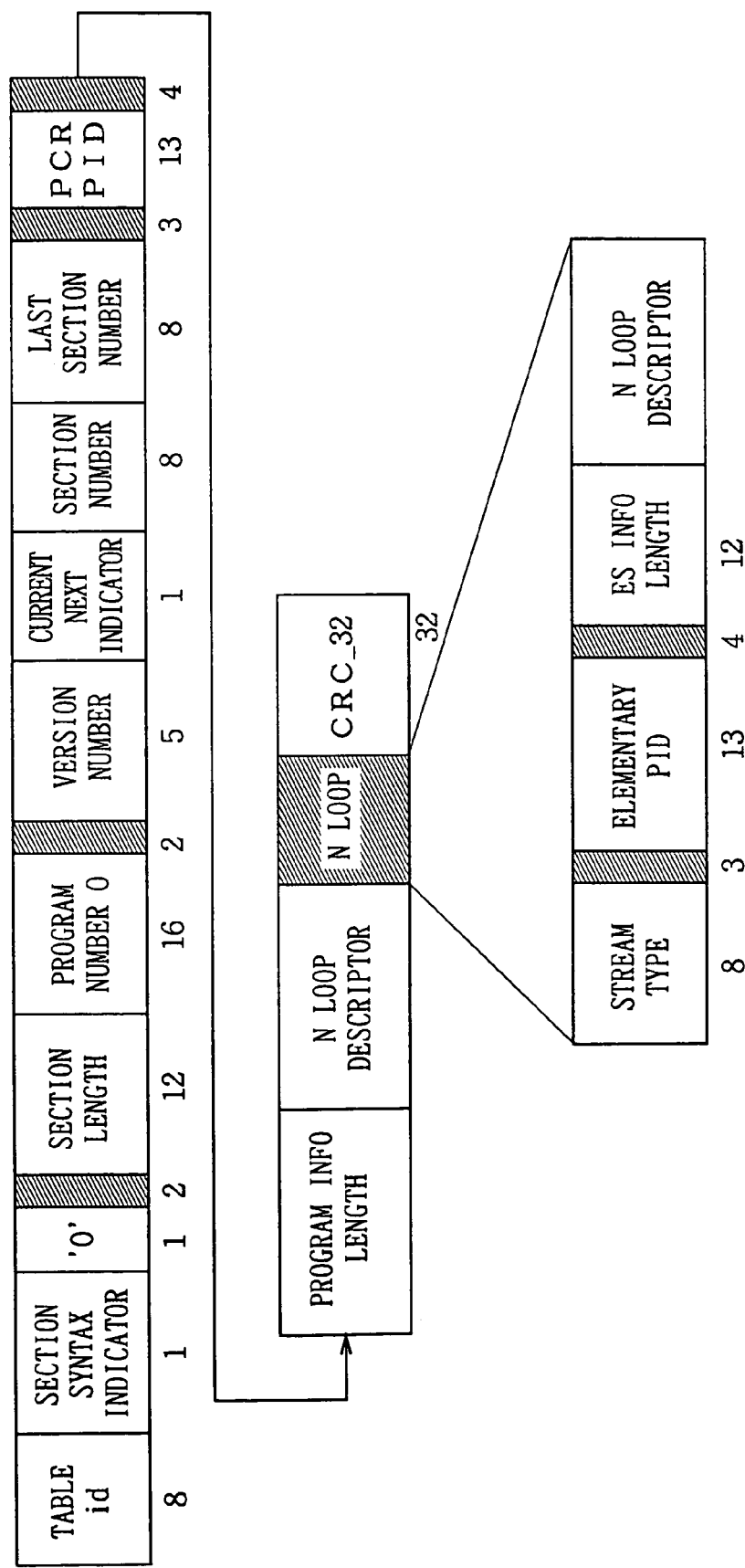
FIG. 16 is a schematic diagram showing the syntax for a program map section.

Next, the program map table (PMT) is described below with reference to FIGS. 15 and 16.

The program map table is a table used to show the mapping between program numbers and data elements constituting those programs. That is, the program map table is a section to specify, for each program number, PIDs of transport stream packets to transmit elements such as video data, audio data, and other additional data constituting that program. Specifically, the program map table consists of the following: table_id, section_syntax_indicator, section_length, program_number, version_number, current_next_indicator, section_number, last_section_number, PCR_PID, program_info_length, descriptor( ), stream_type, elementary_PID, ES_info_length, and descriptor( ).

The table_id shows a unique identification number assigned to identify each table. The table_id of the program map table is "0x02".

The section_syntax_indicator is a constant fixed to "1".

The section_length is a field for indicating in bytes the length from the bit following this section_length to the last byte of the CRC section.

The program_number is a unique number given to each of a plurality of programs to be multiplexed. For example, in a data transmission device according to the present invention, the program numbers 1 through 9 are assigned to 9 programs to be multiplexed, respectively.

The version_number is data for indicating the version number of a program map section which constitutes the program map table. The version number is incremented when data transmitted in the program map section is changed.

The current_next_indicator is data for indicating whether the transmitted program association table is currently available. If the program association table is currently available, the current_next_indicator is set to "1"; if the program association table is not currently available, the current_next_indicator is set to "0".

The section_number is data for indicating the number of a section contained in the program map table and it is always set to "0x00" because only one program map section exists to constitute the program map table.

The last_section_number is data for indicating the section number of the last section among all the sections specified in the program map table. Therefore, the last_section_number is always set to "0x00" in the program map section which constitutes the program map table.

The PCR_PID is data for indicating the PID of a transport packet containing PCR data which is valid for a program specified by the program_number.

The program_info_length is data for specifying the number of bytes for the descriptor( ) described following the program_info_length field.

The descriptor( ) is a data structure used to expand the definitions of programs and program elements. Various descriptors may be possible, for example, video_stream_descriptor( ) to describe basic information which identifies encoding parameters for video elementary streams; audio_stream_descriptor( ) to describe basic information which identifies an encoding version for audio elementary streams; hierarchy_descriptor( ) to describe information which identifies program elements containing hierarchically-encoded video and audio data multiplexed into a plurality of streams; resistration_descriptor( ) to describe information which identifies private data uniquely and definitely; data_stream_alignment_descriptor( ) to describe the alignment type which exists between elementary streams associated with each other; target_background_descriptor to describe information which specifies a background window to be displayed in the background of the display window for transmitted video data; video_window_descriptor to describe information which specifies the display position of the display window for transmitted video data; CA_descriptor( ) to describe a subscription information EMM, a program decryption information ECM, and other data; language_descriptor( ) to describe information which identifies a language and the language used by associated program elements; system_clock_descriptor( ) to transmit information for the system clock used for generation of time stamps; multiplex_buffer_utilization_descriptor( ) to describe data which indicates the critical levels of underflow and overflow of data occupancy in the STD (system target_decoder)

multiplex buffer containing the video_buffer_verifier; copyright_descriptor( ) to describe information which allows identification of audio/visual works to protect the copyrights thereof; maximum_bitrate_descriptor( ) to describe information which specifies the maximum bit rate for transmitted data elements; private_data_indicator_descriptor( ) to specify transmission of private data; smoothing_buffer_descriptor( ) to describe information for the size of a smoothing buffer and the leak rate of output from that buffer; STD_descriptor( ) to specify the leak value of an STD buffer; and ibp_descriptor( ) to describe information for encoding types.

It should be appreciated that in a data transmission device according to the present invention, a data structure of descriptor( ) used in the program map table is intended to describe information which specifies the PID of a transport stream packet containing a program decryption information ECM.

The stream_type is data for specifying the type of a program element contained in a packet with the PID specified by the elementary_PID described below. For example, the stream_type is set to "0x01" if a program element contained in the packet is video data conformable to the ISO/IEC11172 standard, it is set to "0x02" if a program element is video data conformable to the ISO/IEC13818-2 standard, it is set to "0x03" if a program element is audio data conformable to the ISO/IEC11172 standard; and it is set to "0x04" if a program element is audio data conformable to the ISO/IEC13818-3 standard. In the program map section, the stream_type is repeated as many times as the number of elements constituting a program specified by the program_number.

The elementary_PID is a field for specifying the PID of a transport stream packet which transmits elements constituting a program specified by the program_number. The elementary_PID is data described correspondingly to the stream_type which indicates the type of a stream element.

The ES_info_length is data for specifying the number of bytes of a descriptor described following the ES_info_length field.

Next, the conditional access table (CAT) is described below in detail with reference to FIGS. 17 and 18. The conditional access table is a section for specifying the PID of a packet which transmits subscription information EMMs used to descramble video data and audio data in a pay broadcast system. The conditional access table is also a section for specifying the relationship between a conditional access system (CA system: Conditional Access System) which allows only subscribers to descramble programs and a subscription information EMM.

The PID of the conditional access table is not specified by the program association table like the program map table and therefore, each field of the conditional access table can be decoded by finding the unique PID value "0x01" assigned to the conditional access table from bit streams.

Specifically, the conditional access table consists of the following: table_id, section_syntax_indicator, section_length, version_number, current_next_indicator, section_number, last_section_number, and descriptor( ).

The table_id shows a unique identification number assigned to each table and the table_id assigned to the conditional access table CAT is "0x01".

The section_syntax_indicator is a constant fixed to "1". The section_length is a field for indicating in bytes the length from the bit following this section_length to the last byte of the CRC section. The version_number is data for indicating the version number of the conditional access table (CAT). The version_number is incremented by 1 when any setting of the conditional access table is changed. The current_next_indicator is data for indicating whether the transmitted conditional access table is currently available. If the conditional access table is currently available, the current_next_indicator is set to "1"; if the conditional access table is not currently available, the current_next_indicator is set to "0".

The section_number is data for indicating the section number of the conditional access table. For example, the CA_section( ) field contained in the conditional access table is set to "0x00" to indicate that it is the first section. The section_number is incremented by 1 each time the sections contained in the conditional access table increase.

The last_section_number is data for indicating the section number of the last section among all the sections specified in the conditional access table.

As described above, the descriptor( ) is a data structure used to expand the definitions of programs and program elements. It should be appreciated that in a data transmission device according to the present invention, a data structure of descriptor( ) used in the conditional access table is intended to describe information which specifies the PID of a transport stream packet containing a subscription information EMM.

Next, the conditional access descriptor CA_descriptor( ) used in the program map table and the conditional access table is described below with reference to FIG. 19.

The conditional access descriptor is used to specify a subscription information EMM containing personal information on subscription and a work key Kw to decipher enciphered ECM data as well as a program decryption information ECM containing a scramble key Ks to descramble elementary streams such as video and audio. Therefore, if elementary streams such as video and audio are scrambled, the conditional access descriptor always exists in the bit streams.

The conditional access descriptor CA_descriptor( ) consists of the following data: descriptor_tag, descriptor_length, CA_system_ID, CA_PID, and private_data_byte. The descriptor_tag is a unique identification tag for identifying each of a plurality of descriptors as described above. The conditional access descriptor CA_descriptor( ) has a descriptor_tag of "9" assigned thereto. The descriptor_length is data for specifying the number of data bytes of a descriptor immediately following the descriptor_length. The CA_system_ID is data for indicating the type of a conditional access system (CA system) which generates and applies associated ECM or EMM data. The CA_PID indicates the PID of a transport stream containing ECM or EMM data on a conditional access system (CA system) specified by the CA_system_ID.

Figure 20:
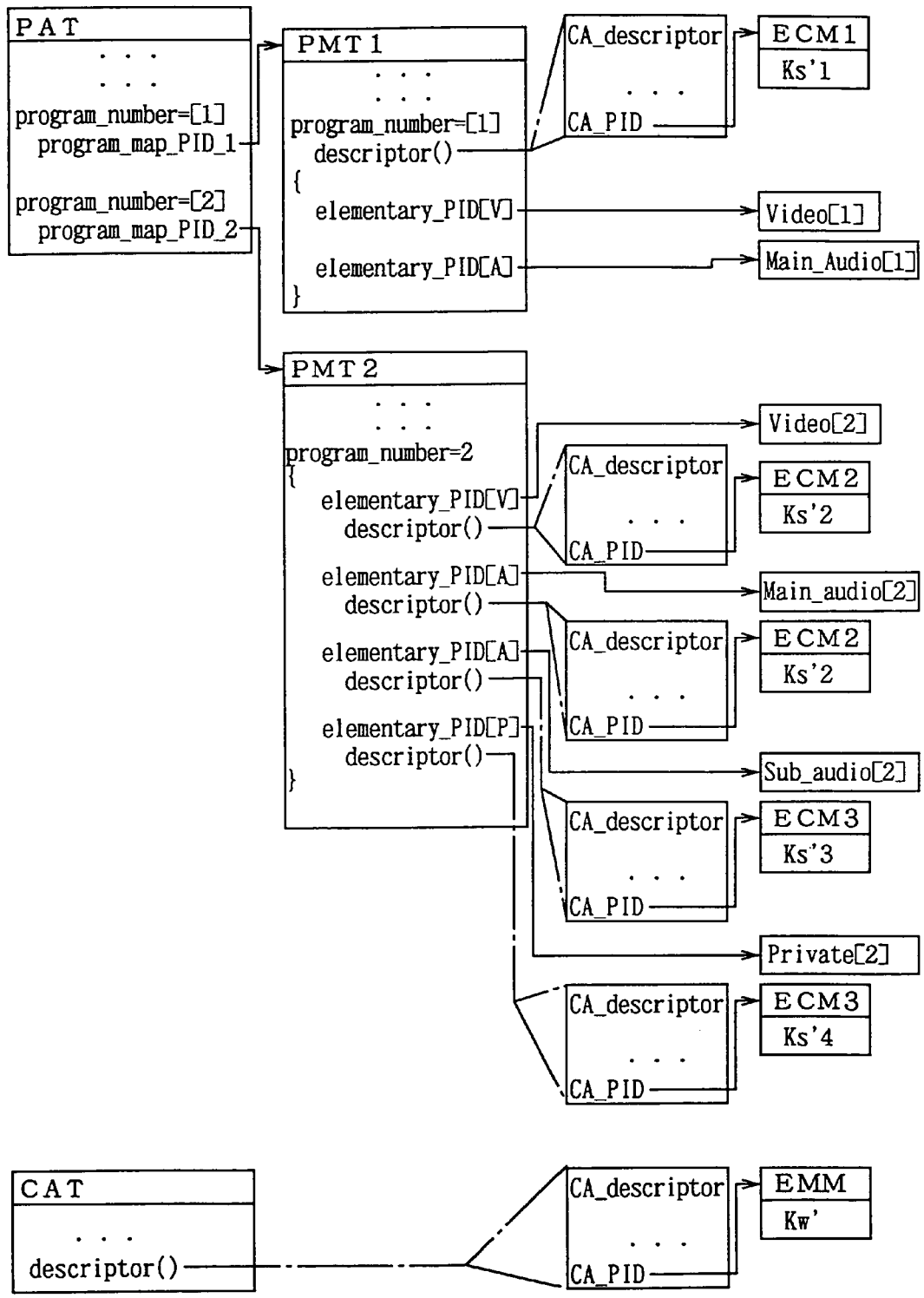
FIG. 20 is a schematic diagram showing the PIDs of elementary data expressed by each table and the contents of the descriptors.

The data contents described in a packet specified by the CA_PID of the conditional access descriptor CA_descriptor( ) may vary from context to context of the CA_descriptor( ). With reference to FIG. 20, a packet specified by the CA_PID is described below.

It should be appreciated first that the data contents described in a packet specified by the CA_PID may vary with the usage of the CA_descriptor( ), that is, whether the CA_descriptor( ) is used in the conditional access table CAT or in the program map table. Specifically, if the CA_descriptor( ) exists in the conditional access table, the CA_PID indicates a transport stream packet containing EMM data. If the CA_descriptor( ) exists in the program map table, the CA_PID indicates a transport stream packet containing ECM data.

In addition, the data contents described in a packet specified by the CA_PID may also vary with the context in the program map table of the conditional access descriptor CA_descriptor( ). In this regard, the context in the program map table of the conditional access descriptor CA_descriptor( ) means whether the CA_descriptor( ) is used in the first FOR statement (FIG. 15) or in the second FOR statement (FIG. 15).

If the conditional access descriptor CA_descriptor( ) is used in the first FOR statement, the CA_PID indicates the PID of a transport stream packet containing ECM data. The first CA_descriptor( ) for this case is used according to the syntax for describing the correspondence between a transport stream packet containing a program specified by the program_number and a transport stream packet containing ECM data. That is, the same ECM data has been assigned to all data elements contained in the program specified by the program_number. In other words, all data elements in the program have been scrambled and descrambled with the same scramble key.

On the contrary, if the conditional access descriptor CA_descriptor( ) is used in the second FOR statement as the second CA_descriptor( ), the CA_PID also indicates the PID of a transport stream packet containing ECM data. However, the second CA_descriptor( ) is not intended to describe the correspondence between a transport stream packet containing a program specified by the program_number and a transport stream packet containing ECM data but this CA_descriptor( ) describes the correspondence between a transport stream packet containing data elements specified by the elementary_PID and a transport stream packet containing ECM data. That is, different ECM data has been assigned to each data element specified by the elementary_PID. In other words, different data elements in the program have been scrambled and descrambled with different scramble keys. When it is assumed that a program consists of a channel of video data and two channels, that is, main audio and subaudio, of audio data, using different scramble keys for each data element in such a manner may allow the system to scramble the subaudio data with a different scramble key from those for other channels.

Next, EMM data and ECM data are described below.

EMM (Entitlement Management Message) data is data which contains subscription information indicating programs subscribed for by a subscriber and a work key Kw used to encipher a scramble key Ks. EMM data is transmitted in the payload of a transport stream packet like the program association table PAT, the program map table PMT, and the conditional access table CAT. In the following description, a transport stream packet containing EMM data will be referred to as an EMM packet.

Figure 21:
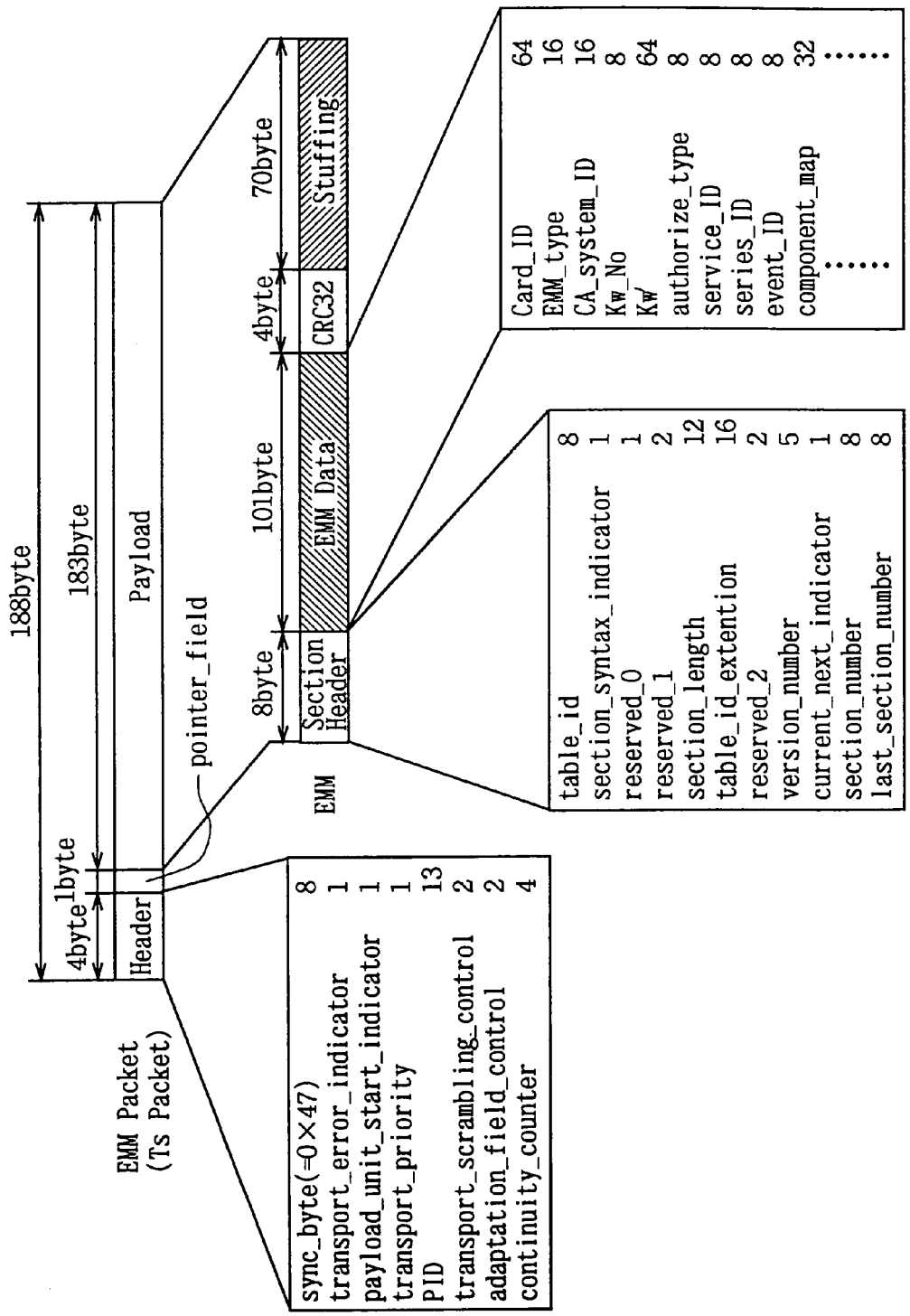
FIG. 21 is a schematic diagram showing the data configuration for EMM packets.

As shown in FIG. 21, an EMM packet consists of a header of 4 bytes and a payload section of 183 bytes. Like a transport stream packet as described above, the header of an EMM packet consists of the following data fields: sync_byte, transport_error indicator, payload_unit_start_indicator, transport_priority, PID, transport_scrambling_control, adaptation_field_control, and continuity_counter. The payload section of 183 bytes consists of an EMM section header, EMM data, CRC, and stuffing bytes.

The EMM section header consists of the following data fields: table_id, section_syntax_indicator, reserved_0, reserved_1, section_length, table_id_extention, reserved_2, version_number, current_next_indicator, section_number, and last_section_number. The table_id is a unique identification number assigned to each table (each section). The EMM section has user-definable table_id "0x40" through "0xFE" assigned as identification numbers. The section_syntax_indicator is a constant fixed to "1". The section_length is a data field for indicating in bytes the length from the bit following this section_length to the last byte of the CRC section. The table_id_extention is data for indicating whether there is any extension data of the EMM section. The version_number is data for indicating the version number of the EMM section. The version number is incremented when any parameter of the EMM section changes in a transportstream. The current_next_indicator is data for indicating whether the transmitted EMM section is currently available. The section_number is data for indicating the number of the EMM section and it is always "1". The last_section_number is data for indicating the section number of the last section in the EMM section and it is always "1".

The EMM data consists of the following data fields: card_ID, EMM_type, CA_system_ID, Kw_No, Kw, authorize_type, service_ID, series_ID, event_ID, and component_map.

The card_ID is an identification number given to a unique IC card mounted on the IRD and it is also used as an identification number for management of its subscriber. The EMM_type is data for indicating the type of EMM data. The CA_system_ID is an identification number given to a CA system containing a subscriber management system. The Kw indicates a work key used to encipher a scramble key Ks and the Kw_No is a number for indicating which work key among 256 predefined work keys Kw was used to encipher the scramble key Ks. The authorize_type, the service_ID, the series_ID, and the event_ID are subscription conditions for indicating which program is subscribed for by a subscriber. The component_map is data for indicating which element of the subscribed program is subscribed for.

ECM (Entitlement_Control_Message) data is data which contains scramble keys Ks used to descramble the scrambled programs subscribed for by a subscriber. ECM data is transmitted in the payload of a transport stream packet like the program association table PAT, the program map table PMT, and the conditional access table CAT. In the following description, a transport stream packet containing ECM data will be referred to as an ECM packet. ECM packets will be transmitted at intervals of approximately 100 msec and scramble keys transmitted as EMM data will be updated at intervals of approximately 4 sec.

Figure 22:
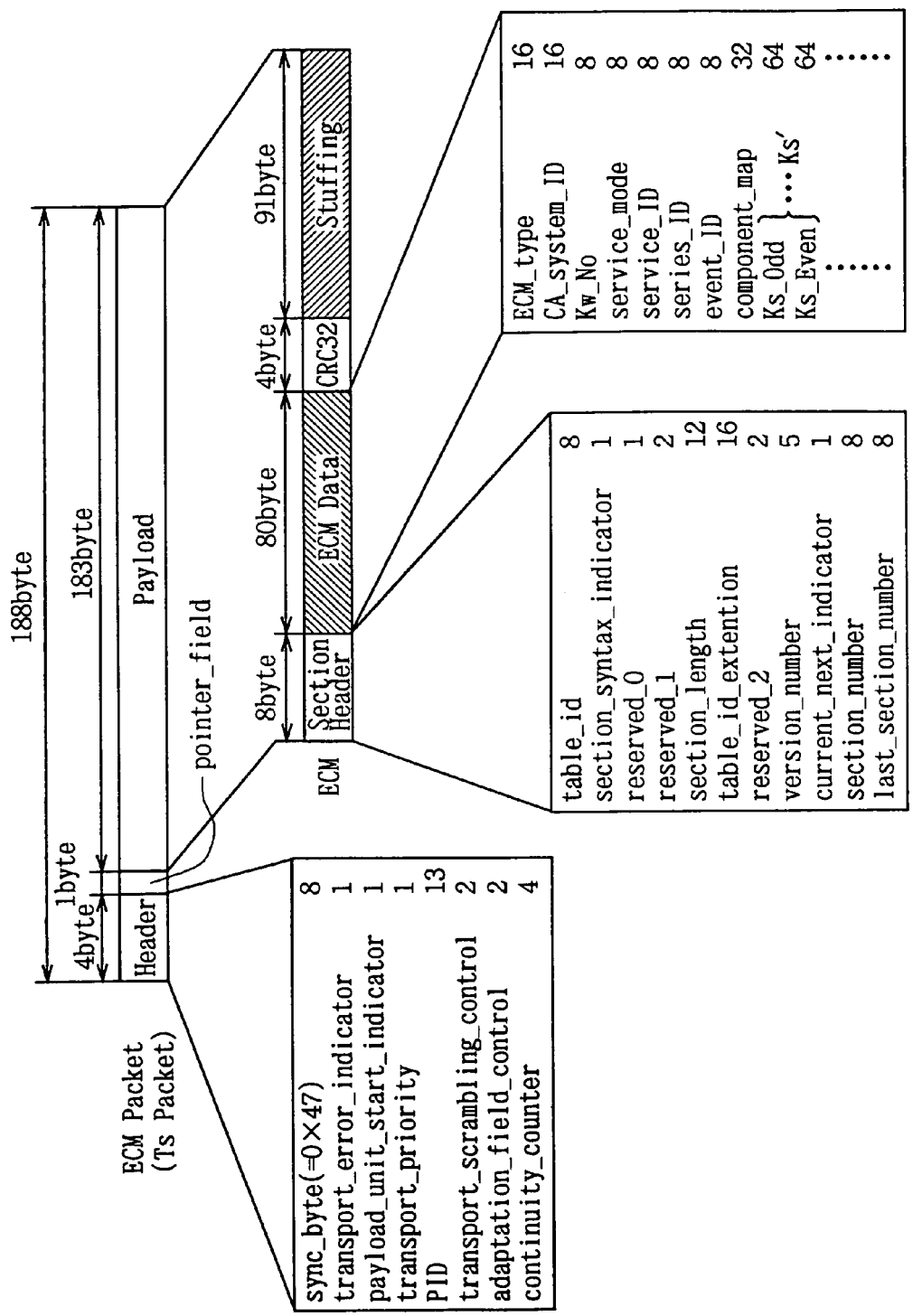
FIG. 22 is a schematic diagram showing the data configuration for ECM packets.

As shown in FIG. 22, an ECM packet consists of a header of 4 bytes and a payload section of 183 bytes. Like a transport stream packet as described above, the header of an ECM packet consists of the following data fields: sync_byte, transport_error_indicator, payload_unit_start_indicator, transport_priority, PID, transport_scrambling_control, adaptation_field_control, and continuity_counter. The payload section of 183 bytes consists of an ECM section header, ECM data, CRC, and stuffing bytes.

The ECM section header consists of the following data fields: table_id, section_syntax_indicator, reserved_0, reserved_1, section_length, table_id_extention, reserved_2, version_number, current_next_indicator, section_number, and last_section_number. The table_id is a unique identification number assigned to each table (each section). The ECM section has user-definable table_id "0x40" through "0xFE" assigned as identification numbers. The section_syntax_indicator is a constant fixed to "1". The section_length is a data field for indicating in bytes the length from the bit following this section_length to the last byte of the CRC section. The table_id_extention is data for indicating whether there is any extension data of the ECM section. The version_number is data for indicating the version number of the ECM section. The version number is incremented when any parameter of the ECM section changes in a transport stream. The current_next_indicator is data for indicating whether the transmitted ECM section is currently available. The section_number is data for indicating the number of the ECM section and it is always "1". The last_section_number is data for indicating the section number of the last section in the ECM section and it is always "11".

The ECM data consists of the following data fields: ECM_type, CA_system_ID, Kw_No, service_mode, service_ID, series_ID, event_ID, component_map, Ks_Odd, and Ks_Even.

The ECM_type is data for indicating the type of ECM data. The CA_system_ID is an identification number given to a CA system containing a subscriber management system. The Kw_No is a number for indicating which work key among 256 predefined work keys Kw was used to encipher a scramble key Ks. The service_mode, the service_ID, the series_ID, and the event_ID are subscription conditions for indicating which program is subscribed for by a subscriber. The component_map is data for indicating which element of the subscribed program is subscribed for. The Ks_Odd and the Ks_Even are scramble keys used to scramble transmitted video and audio data. The scramble keys consist of the odd keys Ks_Odd and the even keys Ks_Even and the odd keys and the even keys are alternately used as scramble keys at intervals of 4 sec.

Figure 23:
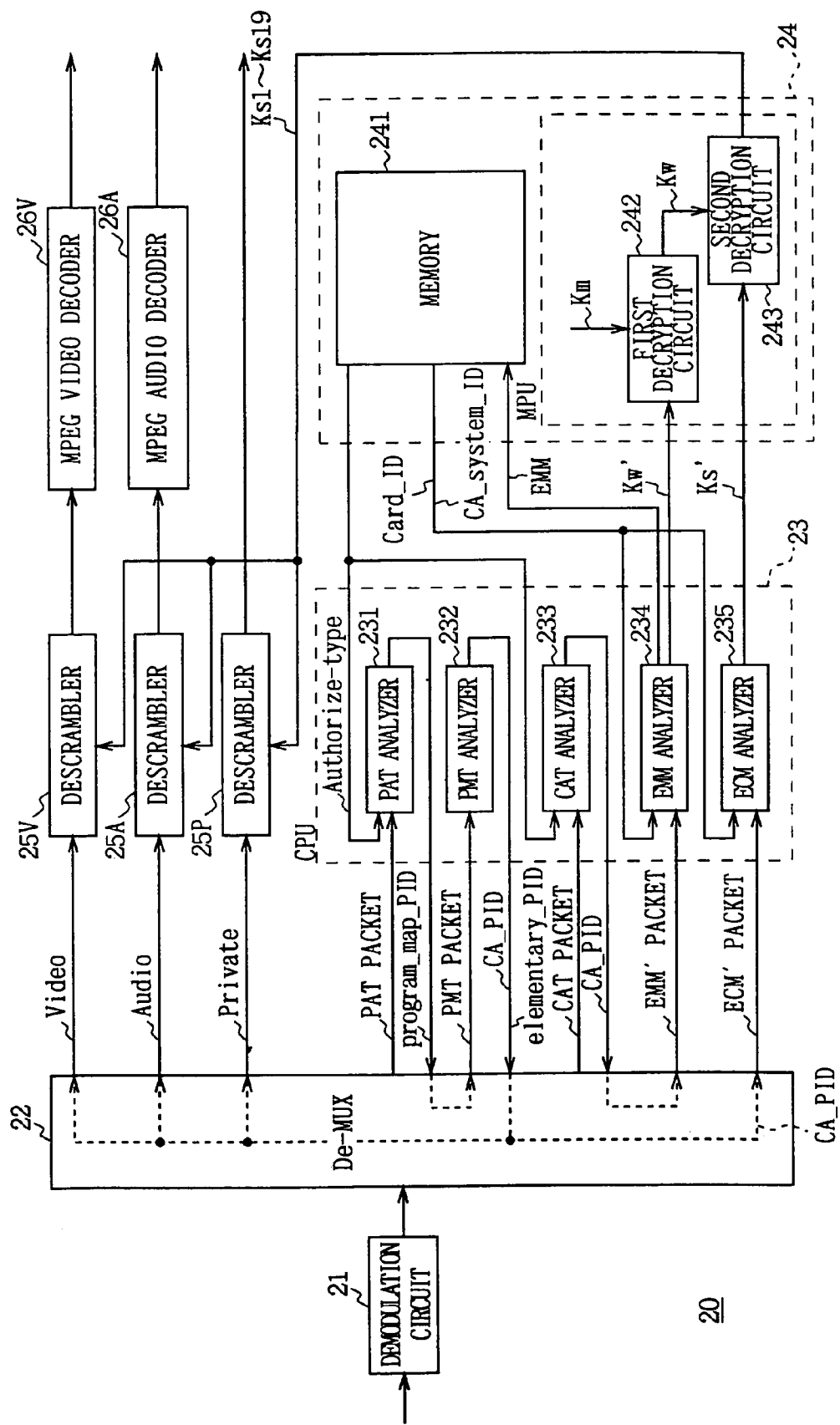
FIG. 23 is a block diagram showing the configuration of a reception device.

Next, the IRD (Integrated_Receiver_Decoder) 20 provided as a receiver is described below in detail with reference to FIG. 23.

The IRD comprises a demodulation circuit 21 for demodulating modulated streams transmitted via a satellite, a demultiplexer 22 for dividing the streams demodulated by the demodulation circuit 21 into packet types, a CPU 23 for receiving PAT packets, PMT packets, CAT packets, EMM packets, and ECM packets divided by the demultiplexer 22, a security module 24 for deciphering enciphered work keys Kw' and enciphered scramble keys Ks', descramblers 25V, 25A, and 25P for descrambling scrambled video streams, audio streams, and private data streams, and decoders 26V and 26A for decoding video streams and audio streams.

The demultiplexer 22 functions to receive a control command from the CPU 23 and supply an appropriate transport stream packet to the CPU 23 with a proper timing in response to that command.

The CPU 23 comprises a PAT packet analyzer 231 for analyzing PAT packets supplied by the demultiplexer 22, a PMT packet analyzer 232 for analyzing PMT packets supplied by the demultiplexer 22, a CAT packet analyzer 233 for analyzing CAT packets supplied by the demultiplexer 22, an EMM packet analyzer 234 for analyzing EMM' packets supplied by the demultiplexer 22, and an ECM packet analyzer 235 for analyzing ECM' packets supplied by the demultiplexer 22.

The PAT analyzer 231 analyzes a transport stream packet supplied by the demultiplexer 22 as a PAT packet to obtain the program_number and the program_map_PID contained in the PAT packet. The PAT analyzer 231 also receives from the security module 24 the authorize_type indicating which program is subscribed for by a subscriber. Then the PAT analyzer 231 compares the authorize_type supplied by the security module with the program_number supplied by the demultiplexer 22 and selects only the program_map_PID corresponding to the program_number which is consistent with the program subscribed for by the subscriber. Thus, the PAT analyzer 231 can obtain only the PID of a program map table corresponding to that program.

Then the demultiplexer 22 selects a transport stream packet with the PID specified by the program_map_PID supplied by the PAT analyzer 231 to provide the selected transport stream packet to the PMT analyzer 232 as a PMT packet.

The PMT analyzer 232 analyzes PMT data contained in a PMT packet with the PID specified by the program_map_PID. Specifically, the PMT analyzer 232 obtains from the elementary_PID described as PMT data in the PMT packet the PID of a transport stream packet containing data elements which constitute a program specified by the program_number. For example, assuming that a program consists of two data elements, that is, video data and audio data, the first elementary_PID will specify a transport stream packet containing a video stream and the second elementary_PID will specify another transport stream packet containing an audio stream.

In addition, the PMT analyzer 232 references the CA_descriptor described in PMT data as a descriptor( ) function. Then the PMT analyzer 232 obtains the CA_PID described in the CA_descriptor and feeds back this CA_PID to the demultiplexer 22. The CA_PID described in the CA_descriptor is data for indicating the PID of a transport stream packet containing ECM data.

Then the demultiplexer 22 provides a transport stream packet with the PID specified by the elementary_PID supplied by the PMT analyzer 232 to an appropriate processing circuit. For example, if the data element is a video stream, it is provided to the descrambler 25V for descrambling video streams; if the data element is an audio stream, it is provided to the descrambler 25A for descrambling audio streams; if the data element is a private data stream, it is provided to the descrambler 25P for descrambling private data streams.

In addition, the demultiplexer 22 supplies a transport stream packet with the PID specified by the CA_PID to the ECM analyzer 235 as an ECM packet. Thus, the ECM data supplied to the ECM analyzer 235 contains only ECM data concerning a program subscribed for by a subscriber.

The ECM analyzer 235 first filters an ECM' packet received from the demultiplexer 22. Specifically, the ECM analyzer 235 compares the CA_system_ID in the ECM data with the CA_system_ID supplied by the security module 24 and selects only an ECM packet containing the CA_system_ID which matches the CA_system_ID supplied by the security module 24. Then the ECM analyzer 235 can obtain enciphered scramble keys Ks' by analyzing ECM data contained in the selected ECM packet. The ECM analyzer 235 supplies the enciphered scramble keys Ks' to a decryption circuit 242 in a microprocessor MPU of the security module 24.

The demultiplexer 22 detects a transport stream packet with the PID of a CAT packet from a transmitted bit stream and provides the detected transport stream packet to the CAT analyzer 233 as a CAT packet.

The CAT analyzer 233 detects a CA_descriptor( ) function contained in the CAT packet received from the demultiplexer 22 and obtains the PID of a transport stream packet specified by the CA_descriptor( ) of the CAT packet from the CA_PID in the CA_descriptor( ) function. The transport stream packet specified by the CA_descriptor( ) of the CAT packet is a transport stream packet containing EMM information.

The demultiplexer 22 selects a transport stream packet with the PID specified by the CA_PID received from the CAT analyzer 233 from a transmitted bit stream and supplies the selected transport stream packet to the EMM analyzer 234 as an EMM' packet.

The EMM analyzer 234 first filters an EMM' packet received from the demultiplexer 22 and selects only an EMM' packet corresponding to the security module. Specifically, EMM data contained in an EMM' packet can be obtained by referencing the CA_PID, because a transport stream packet specified by the CA_PID of the CA_descriptor( ) for the EMM packet received from the demultiplexer 22 is an EMM' packet containing EMM data. The EMM analyzer 234 compares the Card_ID and the CA_system_ID in the EMM data with the Card_ID and the CA_system_ID supplied by a memory 241 of the security module 24 and selects only an EMM' packet containing the Card_ID and the CA_system_ID which match the Card_ID and the CA_system_ID supplied by the security module 24, respectively.

Then the EMM analyzer 234 supplies EMM data of 101 bytes contained in the selected EMM packet to the memory 241 of the security module 24 as the latest EMM data to replace old EMM data in the memory 241. In addition, the EMM analyzer 234 supplies an enciphered work key Kw' contained in the EMM data to the decryption circuit 242 in the microprocessor MPU of the security module 24.

The security module 24 consists of the memory 241 and the microprocessor comprising the first decryption circuit 242 and the second decryption circuit 243. The security module 24 is composed of, for example, an IC card which is removable from the IRD.

The first decryption circuit 242 of the security module 24 receives an enciphered work key Kw' from the EMM analyzer 234 to decipher the enciphered work key Kw' with a prestored master key Km. Then the first decryption circuit 242 supplies the deciphered work key Kw to the second decryption circuit 243.

The second decryption circuit 243 of the security module 24 receives an enciphered scramble key Ks' from the ECM circuit 235 as well as the deciphered work key Kw from the first decryption circuit 242 to decipher the enciphered scramble key Ks' with the deciphered work key Kw. The deciphered scramble key Ks is supplied to the descramblers 25V, 25A, and 25P. It should be appreciated that in the foregoing, the same scramble key Ks is supplied to the descramblers 25V, 25A, and 25P but different scramble keys Ks may be supplied to different descramblers if a different scramble key Ks is defined for each data element.

From the foregoing, in a data multiplexing device of such a configuration that transport stream packets of program data which consists of a plurality of data elements are multiplexed and transmitted, a scramble key corresponding to one or more data elements among a plurality of data elements constituting a program is generated and then each data element is scrambled, thereby each data element can be subscribed for by a subscriber.

Since each of multiplexed transport stream packets is scrambled with its corresponding scramble key, the circuit configuration for scrambling can be made simpler than that for scrambling each transport stream packet before multiplexing.

Any overflow from a buffer memory for buffering higher priority data elements can be avoided by switchably controlling a switch means to exclude a buffer memory for buffering lower priority information among a plurality of buffer memories, when the input rate for a data element supplied to each buffer memory is higher than a reference rate.

At the receiver end, different data elements can be descrambled separately by descrambling with a scramble key the transport stream packets of each data element corresponding to that scramble key.

According to the above-mentioned configuration, a data multiplexing device which allows a subscriber to watch and/or hear desired data elements only can be achieved by a simpler implementation.

Moreover, any overflow from a buffer memory can be avoided effectively by excluding lower priority data elements from the selections and multiplexing desired data elements in preference to others.

INDUSTRIAL APPLICABILITY

The present invention is applicable to a digital broadcast system which performs compression-coding of video data and audio data according to the MPEG2 and transmits the coded streams over a ground wave or a satellite wave.

The invention claimed is:

1. A data multiplexing device which multiplexes a plurality of data elements, each data element comprising at least a portion of a data program to be output at a receiving device, all of said corresponding data elements being output substantially simultaneously to form an output data program, and transmits said multiplexed data elements as a transport data stream, comprising:
scramble key generation means for generating a plurality of scramble keys, one corresponding to each of said plurality of corresponding, and substantially simultaneously output data elements, wherein each of said scramble keys is updated at predetermined intervals;
scramble means for selectively scrambling each of said plurality of substantially simultaneously output data elements by using said corresponding one of said scramble keys generated by said scramble key generation means to scramble a corresponding one of each of said plurality of substantially simultaneously output data elements; and
encoder controlling means for assigning higher or lower encoding bit rates to each of a plurality of encoders when encoding each of said plurality of data elements based on a bit rate generated from each of said plurality of data elements so that said encoder controlling means is capable of managing all different generated bit rates without sacrificing quality of said output data program.

2. A data multiplexing device according to claim 1, wherein said scramble means scrambles each of said multiplexed data elements by using said scramble key corresponding to each of said data elements.

3. A data multiplexing device according to claim 2, wherein said scramble means searches for each scramble key for scrambling each of said data elements by using a correspondence table which shows packet identification codes for each of said data elements and their corresponding scramble keys.

4. A data multiplexing device according to claim 2, wherein said data multiplexing device comprises a first encryption means for enciphering said scramble key with a work key and multiplexes said enciphered scramble key with each of said data elements to transmit it.

5. A data multiplexing device according to claim 1, wherein said plurality of data elements constituting said program are video data, main audio data, sub audio data and private data.

6. A data multiplexing device which multiplexes a plurality of data elements, each data element comprising at least a portion of a data program to be output at a receiving device, all of said corresponding data elements being output substantially simultaneously to form an output data program, and transmits said multiplexed data elements as a transport data stream, comprising:

scramble key generation means for generating a plurality of scramble keys, one corresponding to each of said plurality of corresponding, and substantially simultaneously output data elements, wherein each of said scramble keys is updated at predetermined intervals;

scramble means for selectively scrambling each of said plurality of substantially simultaneously output data elements by using said corresponding one of said scramble keys generated by said scramble key generation means to scramble a corresponding one of each of said plurality of substantially simultaneously output data elements; and encoder controlling means for assigning a different encoding bit rate to each of a plurality of encoders when encoding each of said plurality of data elements based on the complexity of each of said plurality of data elements;

wherein said scramble means scrambles each of said multiplexed data elements by using said scramble key corresponding to each of said data elements;

wherein said data multiplexing device comprises a first encryption means for enciphering said scramble key with a work key and multiplexes said enciphered scramble key with each of said data elements to transmit it; and wherein said data multiplexing device comprises a second encryption means for enciphering said work key with a master key and multiplexes said enciphered work key with each of said data elements to transmit it.

7. A data reception device for receiving a transport data stream including multiplexed data obtained by multiplexing a plurality of data elements, each data element comprising at least a portion of a data program to be output at a receiving device, all of said corresponding data elements being output substantially simultaneously to form an output data program, and said data reception device comprising:

scramble key extract means for extracting from said multiplexed data a plurality of enciphered scramble keys, one corresponding to each of said plurality of corresponding, and substantially simultaneously output data elements, wherein each of said enciphered scramble keys is updated at predetermined intervals;

descramble means for selectively descrambling said transport data stream including each of said plurality of substantially simultaneously output data elements by using a scramble key extracted by said scramble key extract means corresponding to each of said plurality of data elements to descramble each of said plurality of substantially simultaneously output data elements; and encoder controlling means for assigning higher or lower encoding bit rates to each of a plurality of encoders when encoding each of said plurality of data elements based on a bit rate generated from each of said plurality of data elements so that said encoder controlling means is capable of managing all different generated bit rates without sacrificing quality of said output data program.

8. A data reception device according to claim 7, wherein said data reception device comprises a first decryption means for deciphering said enciphered scramble key extracted by said scramble key extract means by using a work key received along with said multiplexed data and descrambles said transport stream packet by using said scramble key deciphered by said first decryption means.

* * * * *